(12) United States Patent
Parmar et al.

(10) Patent No.: US 10,628,019 B2
(45) Date of Patent: Apr. 21, 2020

(54) ELECTRONIC DEVICE AND METHOD FOR RENDERING 360-DEGREE MULTIMEDIA CONTENT

(71) Applicant: Samsung Electronics Co., Ltd., Suwon-si, Gyeonggi-do (KR)

(72) Inventors: Monil Parmar, Noida (IN); Manish Chhabra, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/671,761

(22) Filed: Aug. 8, 2017

(65) Prior Publication Data
US 2018/0052595 A1 Feb. 22, 2018

(30) Foreign Application Priority Data
Aug. 22, 2016 (IN) .............................. 201611028491

(51) Int. Cl.
*G06F 3/048* (2013.01)
*G06F 3/0484* (2013.01)
(Continued)

(52) U.S. Cl.
CPC ...... *G06F 3/04847* (2013.01); *G06F 3/04815* (2013.01); *G06F 3/1454* (2013.01);
(Continued)

(58) Field of Classification Search
CPC .. G06F 3/0482; G06F 3/04847; G06F 3/1454; H04N 5/23238; H04N 5/23296
See application file for complete search history.

(56) References Cited

U.S. PATENT DOCUMENTS 5,808,613 A * 9/1998 Marrin .............. G06F 17/30873
345/427
6,567,086 B1 5/2003 Hashimoto
(Continued)

FOREIGN PATENT DOCUMENTS

WO 2015/096626 A1 7/2015

OTHER PUBLICATIONS

Josh Lowensohn, "YouTube now supports 360 degree videos, Flat videos are so 2014", (http://www.theverge.com/2015/3/13/8203173/youtube-now-supports-360-degree-videos), Mar. 13, 2015.
(Continued)

*Primary Examiner* — Thanh T Vu
(74) *Attorney, Agent, or Firm* — Jefferson IP Law, LLP

(57) ABSTRACT

An electronic device and a controlling method of an electronic device are provided. The electronic device includes a display and a processor configured to control the display to display multimedia content with a 360-degree angle of view at a first viewing angle, control the display to display, on the multimedia content, a first user interface (UI) element to change the first viewing angle to a predetermined viewing angle and display the multimedia content at the predetermined viewing angle. Further, in response to the first UI element being selected, the processor is further configured to control the display to display a viewing angle option list to select one of a plurality predefined viewing angles.

22 Claims, 25 Drawing Sheets

(51) Int. Cl.
   *G06F 3/0481*   (2013.01)
   *G06F 3/14*   (2006.01)
   *H04N 5/232*   (2006.01)
   *G09G 3/00*   (2006.01)
   *G06F 3/0482*   (2013.01)

(52) U.S. Cl.
   CPC ....... *H04N 5/23238* (2013.01); *G06F 3/0482* (2013.01); *G09G 3/003* (2013.01); *G09G 2354/00* (2013.01); *H04N 5/23293* (2013.01); *H04N 5/23296* (2013.01)

(56) References Cited

U.S. PATENT DOCUMENTS

| | | | |
|---|---|---|---|
| 8,605,133 B2 | 12/2013 | Lampotang et al. | |
| 8,855,467 B2 | 10/2014 | Amsterdam et al. | |
| 8,990,692 B2 | 3/2015 | Chelba | |
| 2002/0147991 A1 | 10/2002 | Furlan et al. | |
| 2004/0264919 A1 | 12/2004 | Taylor et al. | |
| 2010/0115455 A1* | 5/2010 | Kim | G06F 3/04815 715/781 |
| 2014/0245368 A1 | 8/2014 | Park et al. | |
| 2014/0359665 A1 | 12/2014 | Sung et al. | |
| 2015/0262423 A1* | 9/2015 | Heinz, II | G06T 19/003 386/241 |
| 2016/0301981 A1 | 10/2016 | Xiao et al. | |
| 2017/0064374 A1* | 3/2017 | Eim | G06F 3/04817 |

OTHER PUBLICATIONS

Goggle; "Embed a map or directions" XP55586530A; Google Maps Help; URL:https://web.archive.org/web/20160426190221/https://support.google.com/maps/answer/144361?co=GENIE.Platform%3DDesktop&hl=en; 2016.
European Office Action dated May 15, 2019; Reference: SET/90292EP1; Application #/Patent #: 17843848.7-1209 / 3459262 PCT/KR2017008598.

* cited by examiner

ELECTRONIC DEVICE AND METHOD FOR RENDERING 360-DEGREE MULTIMEDIA CONTENT

CROSS-REFERENCE TO RELATED APPLICATION(S)

This application claims the benefit under 35 U.S.C. § 119(a) of an Indian patent application filed on Aug. 22, 2016, in the Indian Intellectual Property Office and assigned Serial number 201611028491, the entire disclosure of which is hereby incorporated by reference.

TECHNICAL FIELD

The present disclosure relates to an electronic device. More particularly, the present disclosure relates to an electronic device and a control method for rendering immersive multimedia content or 360-degree multimedia content.

BACKGROUND

With advancement in technology, immersive video or 360-degree video is being developed to provide a wholesome viewing experience by enabling a user to view the video in every direction. Immersive videos are created by recording the view of a real-world scene in every direction at the same time.

The user can change or control viewing direction and playback speed during playback of the immersive videos. The user can change or control the viewing direction by moving a device having a gyroscope or infrared sensor that is playing the immersive video. Examples of such devices include, but not limited to, smartphones capable of playing the immersive videos and head-mounted displays. The user can change or control the viewing direction by interacting with video played on a display or projection screen of a computer, notebook, player, and other presentation device such as a head-mounted display.

Various solutions are available for presenting and sharing typical videos, other than immersive videos. In one solution, time-marked hyperlinking to video content is performed. Accordingly, a first user specifies one or more particular instants in the video content other than a beginning of the video on a user interface (UI) rendering the video content. The particular instant may be a particular frame of the video content, a particular point in time with respect to one or more of the beginning of the video content or an end of the video content, or a combination of the two. Upon specifying, the UI generates data representing the one or more particular instants for inclusion in a link to the video content that can be shared via email or chat applications. Automatically or in response to accessing the link, the video content starts playing the first of the one or more particular instants in the video content represented by the data in link. However, this solution is limited to playing videos from a particular user-selected time instant. This solution does not provide any facility to view or share the video at multiple viewing angles.

In another solution, a viewer of a recorded video item is provided with the ability, via a recording medium, to select to watch the video item from different angles and/or heights. The video item is recorded from live events using a plurality of cameras and therefore comprises of a plurality of video tracks recorded on a recording media. The video tracks include data representing views spaced 360° around the video item such that, for example, if there are 8 video tracks available, when the video item is taking place, eight cameras are angularly spaced and located with respect to the item being filmed and directed to said video item. Thus, the viewer can select any of the view and corresponding video track from the recording media being played. In addition, the selection can be performed during viewing via the apparatus used to decode the data from the recording media, for example, a digital versatile disc (DVD) player.

In one another solution, broadcasters have made available multiple channels for single sporting events. Each channel may provide a different viewing angle and/or commentary for viewing the event. A content recorder, which is recording the single sporting event, receives a program view (e.g., a channel) selection. The content recorder then transmits a viewer data request for the currently selected program view to a service provider or broadcaster. The content recorder may then receive requested viewer data of the selected program containing information of the currently selected view and one or more alternate views of the selected program. The content recorder may then determine if the selected program view is the leading view of the selected program. When the selected view is not the leading view and the content recorder is configured for automatic view switching, the content recorder may autonomously switch to the leading view of the selected program. Alternatively, the content recorder may present vote totals of all views of the selected program and enable a selection of a desired alternate view.

As can be gathered, the above solutions enable recording of videos from different viewing angles and accordingly presenting any one viewing angle based on user selection. Thus, these solutions are focused on presenting a video recorded from one viewing angle at a time. However, these solutions do not provide any technique for viewing single immersive video, which has multiple angle information. Further, these solutions still present only one viewing angle at any time to the user. In addition, these solutions do not offer any preview of video at the selected viewing angle. Further, these solutions do not provide any mechanism to share video with preferred angle information.

Thus, there exists a need for a solution to overcome at least the above-mentioned deficiencies.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for rendering immersive multimedia content or 360-degree multimedia content.

In accordance with an aspect of the present disclosure, an electronic device is provided. The electronic device includes a display, and a processor configured to control the display to display, on the multimedia content, a first user interface (UI) element to change the first viewing angle to a predetermined viewing angle and display the multimedia content at the predetermined viewing angle. Further, in response to the first UI element being selected, the processor is further configured to control the display to display a viewing angle option list to select one of a plurality predefined viewing angles.

In accordance with another aspect of the present disclosure, a controlling method of an electronic device is provided. The controlling method includes displaying multimedia content with a 360-degree angle of view at a first viewing angle, displaying, on the multimedia content, a first UI element to change the first viewing angle to a predetermined viewing angle and display the multimedia content at the predetermined viewing angle, and in response to the first UI element being selected, displaying a viewing angle option list to select one of a plurality predefined viewing angles.

In accordance with another aspect of the present disclosure, a non-transitory computer readable recording medium having recorded thereon a program executable by a processor for performing a method of controlling an electronic device is provided. The controlling method includes displaying multimedia content with a 360-degree angle of view at a first viewing angle, displaying, on the multimedia content, a first UI element to change the first viewing angle of the multimedia content to a predetermined viewing angle and display the multimedia content at the predetermined viewing angle, and in response to the first UI element being selected, displaying a viewing angle option list to select one of a plurality predefined viewing angles.

The advantages of the disclosure include, but not limited to, rendering an angular view of the multimedia content at multiple different angles in two user interfaces. This enables the user to watch the 360-degree multimedia content at different angles simultaneously and therefore enabling best utilization of information contained in the 360-degree multimedia content. Thus, a user can interact with the 360-degree multimedia content in a second user interface without disturbing the original 360-degree multimedia content playing in the first user interface, thereby providing a better user-experience.

Further, the user can instantly change a viewing angle of the 360-degree multimedia content in either of the user interfaces by selecting predefined angles rather than manually and gradually changing the viewing angle. This further improves the user-experience.

Furthermore, the multimedia content can be shared at multiple angles such that multimedia content is rendered at the different angle rather than from a default angle of the multimedia content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and/or other aspects features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
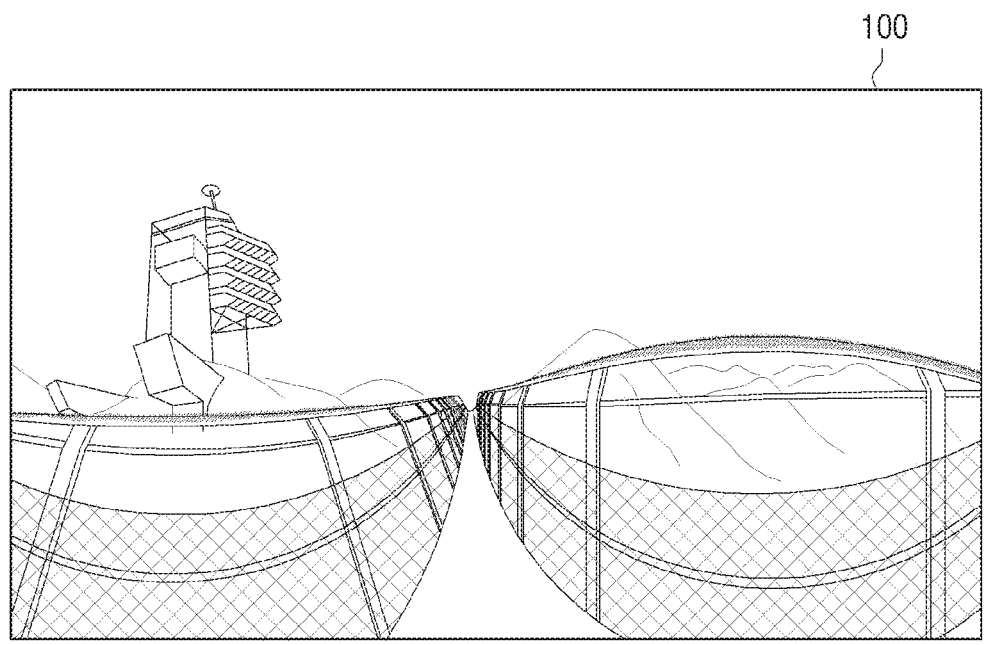
FIGS. 1A and 1B illustrate an example 360-degree multimedia content according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to an aspect of the present disclosure, the multimedia content is rendered within a first user interface (UI) on an electronic device at a first viewing angle. In response to a user-input, the multimedia content at the first viewing angle is rendered within a second UI. The multimedia content is rendered as a preview in the second UI, the preview being an angular view of the multimedia content at the first viewing angle. Thereafter, a command to change a viewing angle of the multimedia content within the second UI is received from the user. The command includes information pertaining to at least one second viewing angle, such that multimedia content is rendered within the second UI in accordance with the information pertaining to at least one second viewing angle.

Further, at least one predefined list of viewing angles is provided on the first UI. Upon receiving a selection of a further viewing angle from the at least one predefined list of viewing angles, the multimedia content is rendering within the first UI in accordance with the further viewing angle.

According to another aspect of the present disclosure, the multimedia content is rendered within a UI at a first viewing angle. A command for sharing the multimedia content with one or more recipients is received from a user. The command includes information pertaining to at least one viewing angle. In response to the command, a viewing mechanism is created and shared such that the viewing mechanism allows the one or more recipients to view the multimedia content in accordance with the information pertaining to at least one second viewing angle. The viewing mechanism can be either an angle-marked link or an angle-marked multimedia content.

Figure 1B:
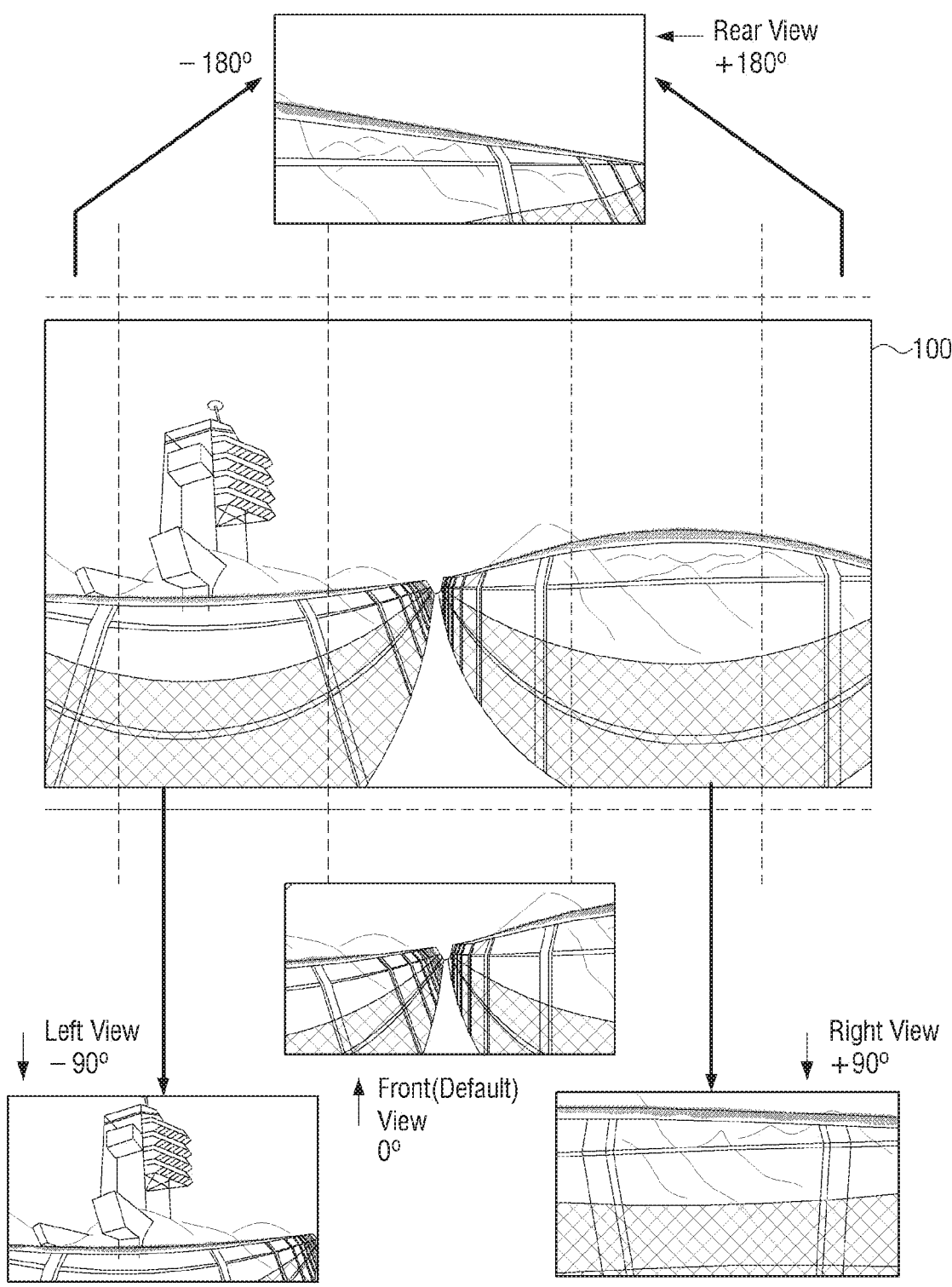

FIGS. 1A and 1B illustrate an example 360-degree multimedia content according to the related art.

Referring to FIG. 1A, FIG. 1A illustrates one example complete frame 100 of an example immersive video. For example, an immersive video stream contains information of all directions or whole 360-degree views of the real-world scene.

Referring to FIG. 1B, FIG. 1B illustrates different video frames with a different viewing direction or angle. For example, video frames have different angles such as 0° (default and front view), −90° (left view), +90° (right view), and −180°, +180° (back or rear view) obtained from the complete frame 100.

Figure 2:
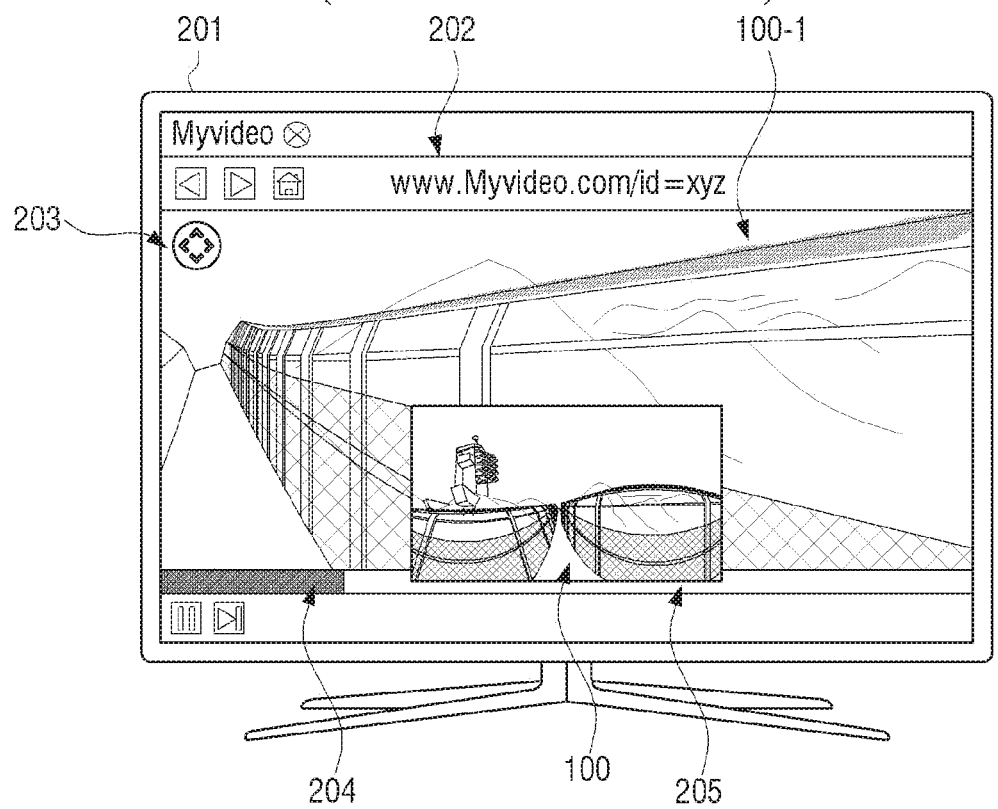
FIG. 2 illustrates an example solution of rendering the 360-degree multimedia content according to the related art.

FIG. 2 illustrates an example solution of rendering the 360-degree multimedia content according to the related art.

FIG. 2 illustrates an example solution of rendering the example immersive video on an electronic device.

Referring to FIG. 2, an electronic device 201 such as desktop may render an immersive video as illustrated in FIG. 1A. The immersive video is hosted on a website and is rendered via a web browser 202. A user can watch the immersive video from one particular view at a time, represented by reference numeral 100-1. To watch a view at some other angle, a graphical user interface (GUI) button 203 is provided on the web browser 202. Further, accessing a progress bar 204 provides a view of the complete frame 100 of the immersive video in a preview window 205.

However, at any time, the user can watch only one view of the immersive video at a time. In addition, the GUI button 203 changes a viewing angle or direction gradually, thereby leading to a limited user experience. Further, the preview window 205 displays the static complete frame 100 of the immersive video thereby further limiting the user experience, as the user is unable to change a viewing angle of the immersive video in the preview window 205. Furthermore, the user is only able to share the immersive video with a recipient such that a web browser at the recipient starts playing the immersive video always at a default angle of the immersive video. The user is not able to share the immersive video with the recipient at specific viewing angle(s).

Figure 3A:
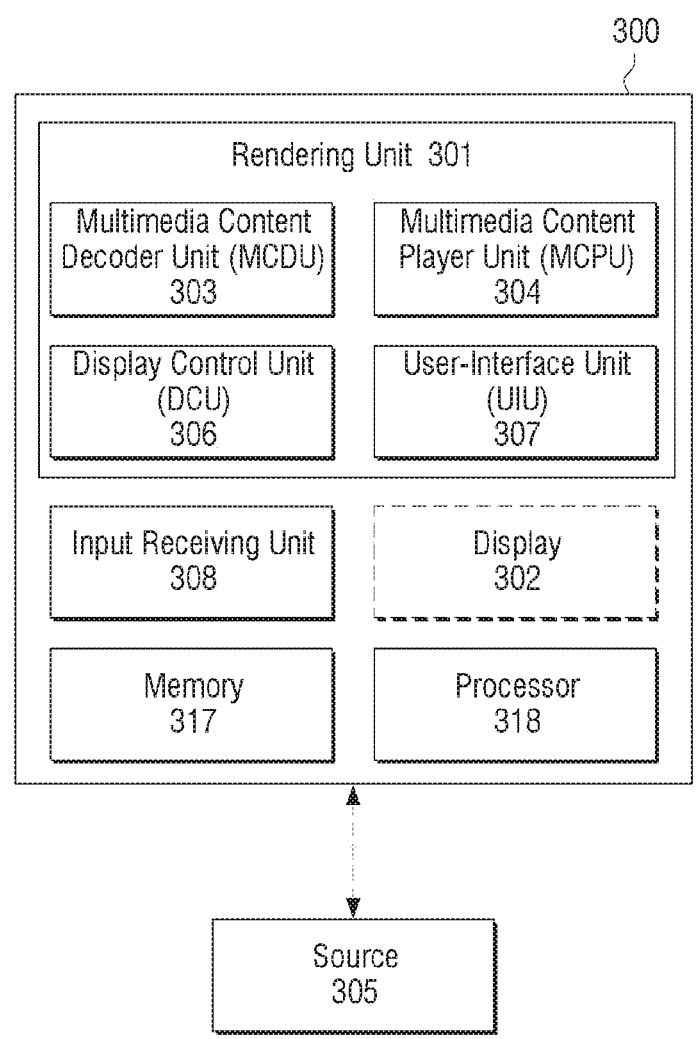
FIGS. 3A and 3B illustrate an electronic device for rendering 360-degree multimedia content according to various embodiments of the present disclosure.
Figure 3B:
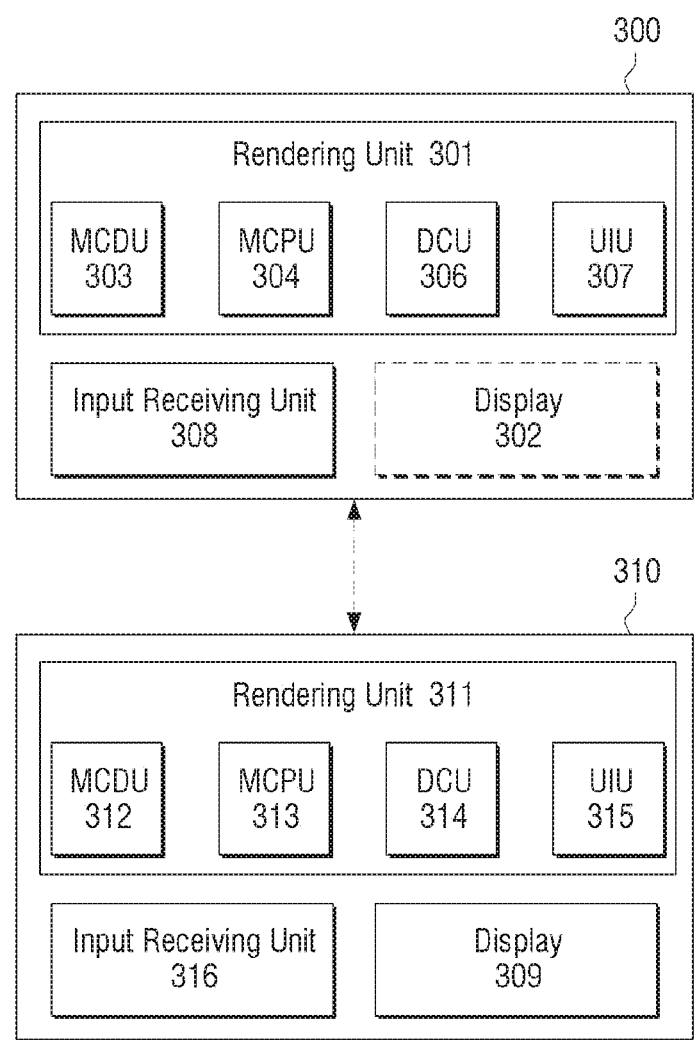

FIGS. 3A and 3B illustrate an electronic device for rendering 360-degree multimedia content (hereinafter interchangeably referred to as multimedia content) according to various embodiments of the present disclosure.

An electronic device 300 may include, but not limited to, smartphone, desktop, notebook, projection screen, and smart television (TV).

Referring to FIG. 3A, the electronic device 300 may include a rendering unit 301 to render the multimedia content at a first viewing angle within a first UI or a primary UI on a display 302 of the electronic device 300. In one example, the first viewing angle can be a default-viewing angle or base angle or a front viewing angle or 0-degree angle. In another example, the first viewing angle can be a viewing angle other than a default angle such as a left viewing angle or −90-degree (minus 90 degree) angle. Examples of the first UI include, but are not limited to, a web browser, a media player, at least one screen in a multi-view/multi-user mode, and at least one screen in split screen mode. In one implementation, the display 302 is an integral part of the electronic device 300. Examples of such implementation include, but are not limited to, a smart TV and a smart phone.

Figure 4A:
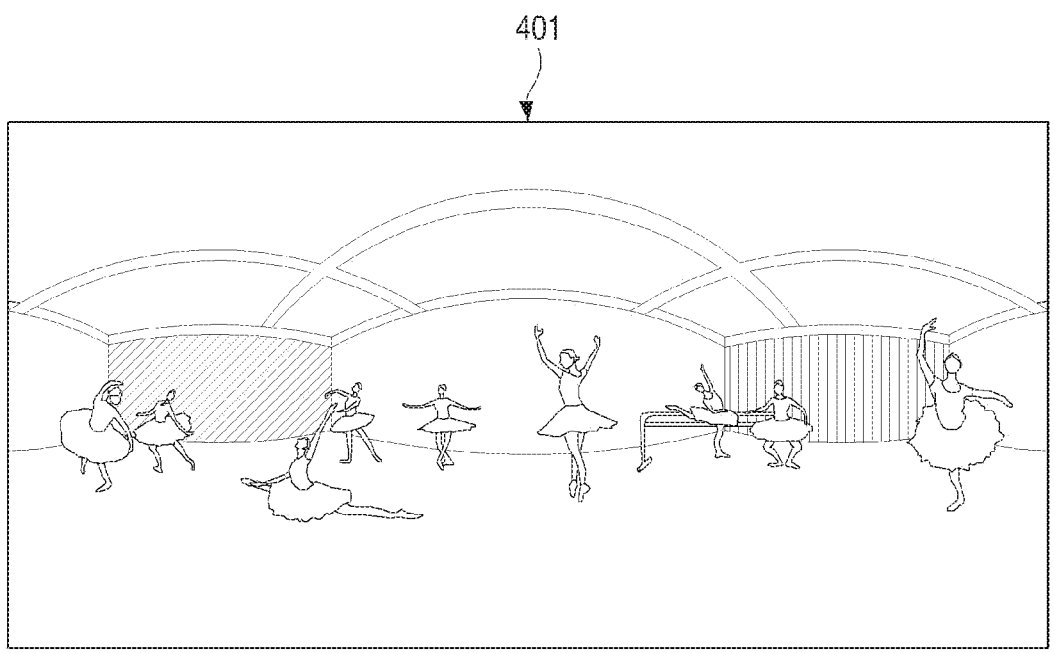
FIGS. 4A, 4B, and 4C illustrate first examples of rendering 360-degree multimedia content according to various embodiments of the present disclosure.
Figure 4B:
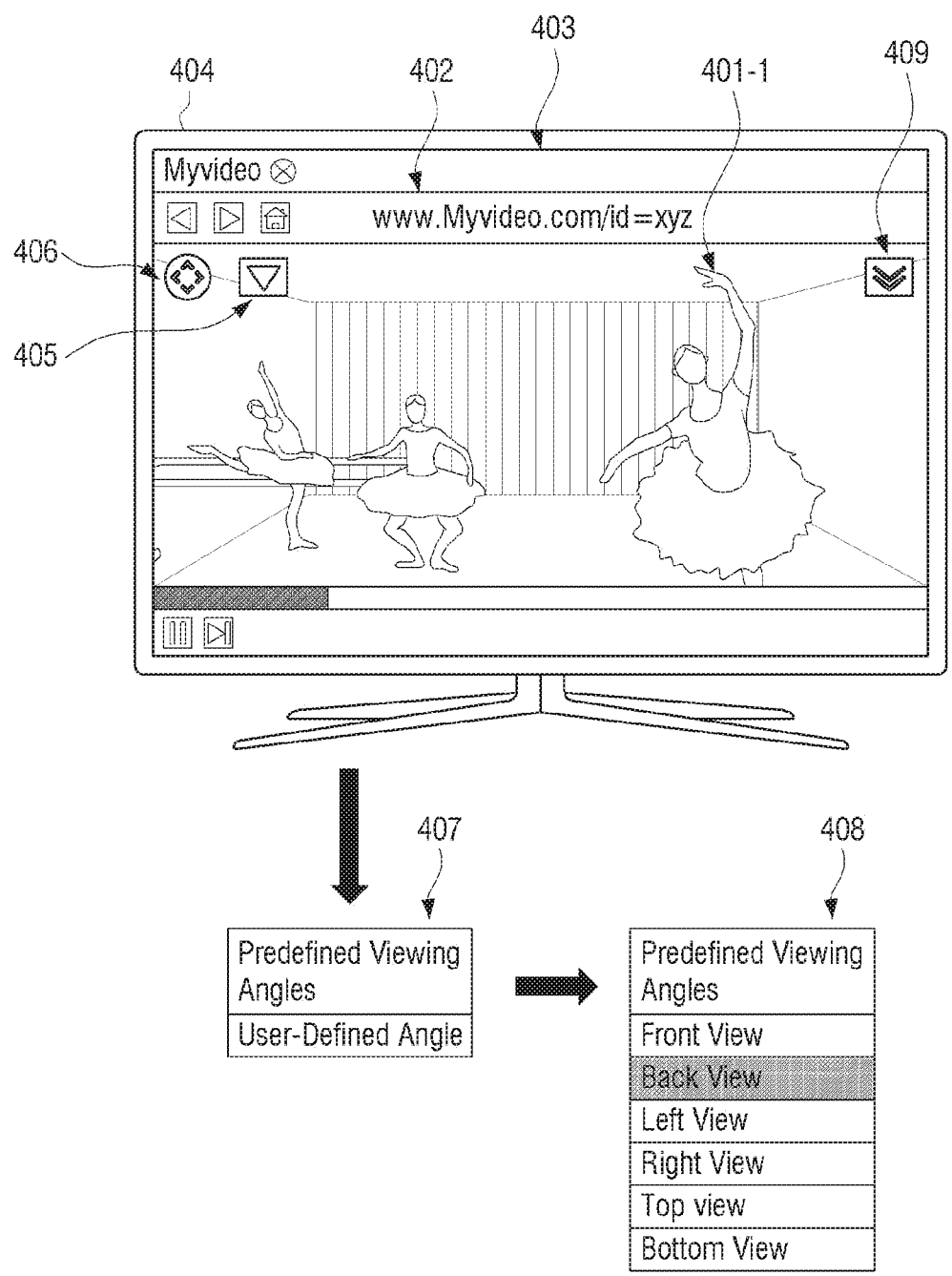

As illustrated in FIG. 4B, the first UI is a web browser 402 that is rendering the multimedia content at first angle on a display 403 of an electronic device 404. In another implementation, referring to FIG. 3A, the display 302 is external to and is communicatively coupled with the electronic device 300 over a network. The network can be a wired network or a wireless network. An example of such an implementation includes, but is not limited to, a 360° video player coupled with a projector screen.

The rendering unit 301 may include a multimedia content decoder unit (MCDU) 303 and a multimedia content player unit (MCPU) 304. The MCDU 303, upon receiving a request to view the multimedia content, may receive the compressed/encrypted multimedia content from a source 305 and decode the multimedia content. In one example, the source 305 can be a web server and application server coupled with the electronic device 300 over the network. In another example, the source 305 can be a storage such as memory of the electronic device 300, a pen drive, and a compact disk. The MCPU 304 then renders or plays the multimedia content in accordance with a viewing angle selected by a user. The rendering unit 301 further includes a display control unit (DCU) 306 to stream the multimedia content in accordance with the viewing angle on the display 302. In one example, the multimedia content is rendered via a web browser on the display 302. In another example, the multimedia content is stored in a memory 317 of the electronic device 300 and is rendered via a video player application on the display 302.

The electronic device 300 may include at least one camera (not shown) to capture a 360-degree video. The at least one camera may track a movement of a target object and capture the target object according to a direction of the movement of the target object. The electronic device 300 may store the captured image according to the direction of the movement of the target object as multimedia content in a storage. The electronic device 300 may store multiple angle information of the captured image according to the movement of the target object. For example, the target object is a person. The electronic device 300 may include at least one sensor. The camera may detect a face (or eyes) or a physiological feature (for example, temperature) of the person through the at least one sensor and capture the person by tracking the movement of the person.

Further, the rendering unit 301 enables a user to instantly rotate or shift the multimedia content at different angles while the multimedia content is being rendered on the first UI. As such, the rendering unit 301 may include a user-interaction unit (UIU) 307 to control a viewing angle of the multimedia content. The UIU 307 may provide at least one predefined list of viewing angles to rotate the multimedia content instantly and for fast access of the multimedia content at different viewing angles. In one implementation, the predefined list of viewing angles includes a default viewing angle or front viewing angle, a back viewing angle, a left viewing angle, a right viewing angle, a top viewing angle, and a bottom-viewing angle. In addition, the UIU 307 may enable the user to provide a user-defined angle manually. Accordingly, the UIU 307 may provide a GUI control element on the first UI for accessing the at least one predefined list of viewing angles and for providing the user-defined angle. Examples of the GUI control element include, but are not limited to, a button, an icon, a widget, and a context menu accessed upon user action, such as a right-click on the display 302. For example, referring to FIG. 4B, the UIU 307 may provide a first GUI control element 405 and a second GUI control element 406 on the web browser 402.

Referring to FIG. 3A, the electronic device 300 may include an input receiving unit 308 to receive a command indicative of a selection of a viewing angle on the first UI. In one implementation, the command is indicative of a selection of a viewing angle from the predefined list of viewing angles. In such an implementation, the user can select an angle via the GUI control element provided on the first UI. The selection can be provided via a touch-based input or a non-touch-based input. The selection can be provided by using an input device such as a mouse, a keyboard, a joystick, and a stylus communicatively coupled with the electronic device 300 or by using a voice recognition module. Thus, the input receiving unit 308 is capable of detecting the command via any type of input.

In another implementation, the command is a manual user-input. In such implementation, the user can provide the user-defined angle manually via the GUI control element provided on the first UI. The user-input can be provided via a touch-based input or a non-touch-based input. The user-input can be provided by using an input device such as a mouse, a keyboard, a joystick, and a stylus communicatively coupled with the electronic device 300 or by using a voice recognition module. Thus, the input receiving unit (308) is capable of detecting the command via any type of user-input.

Upon receiving the selection of the viewing angle, the MCPU 304 instantly changes the viewing angle of the multimedia content to the selected viewing angle by rotating the multimedia content in accordance with the selected viewing angle. The DCU 306 then streams the multimedia content at the selected viewing angle on the first UI. For example, referring to FIG. 4B, the first UI is the web browser 402 that is rendering the multimedia content at a second angle on the display 403 of the electronic device 404.

Further, in accordance with the disclosure, the user may be provided with a functionality to render the multimedia content on a second UI and change a viewing angle within the second UI. Examples of the second UI, include but are not limited to, a web browser, a preview window, a media player, at least one screen in a multi-view/multi-user mode, and at least one screen in split screen mode. For example, as illustrated in FIG. 5B, the second UI is a preview window 509 displayed on a display 503 of an electronic device 504. Accordingly, referring to FIG. 3A, the input receiving unit 308 may receive a user-input indicative of rendering the multimedia content within the second UI.

In one implementation, the user-input is indicative of selecting a portion on a progress bar associated with the multimedia content. The progress bar is provided on the first user interface (UI). For example, as illustrated in FIG. 5B, the first UI is a web browser 502 that is rendering the multimedia content at a first angle. A progress bar 508 may be provided on the web browser 502 to indicate a progression of rendered multimedia content.

In another implementation, the first UI can be displayed via a web browser. In such implementation, the user-input is indicative of accessing a tab associated with the first UI. For example, as illustrated in FIG. 5D, the first UI is the web browser 502 that is rendering the multimedia content at a first angle. A tab 512 is associated with the web browser 502.

In another implementation, the first UI is displayed upon accessing a uniform resource locator (URL) associated with the multimedia content. The URL can be present in any document such as an email and a web page. In such an implementation, the user-input is indicative of accessing or pointing the URL in the document.

In another implementation, the multimedia content is stored in a folder depicting a list of 360-degree multimedia contents stored on the electronic device 300. The first UI is displayed when the user selects the multimedia content from the list in the folder and provides an input to play the multimedia content. In such an implementation, the user-input is indicative of accessing the folder.

Upon receiving the user-input, the DCU 306 streams the second UI on the display 302. Thereafter, the MCPU 304 renders the multimedia content at the first viewing angle within the second UI. In addition, the DCU 306 streams the second UI in accordance with a display mode based on the user-input. The display mode can be an overlay mode, a full screen mode, a picture-in-picture mode, a split screen mode, a multi-view mode/multi-user mode, and an augmented mode. Thus, in an example, as illustrated in FIG. 5B, a user-input 507 is indicative of accessing the progress bar 508 on the first UI or the web browser 502. Upon accessing the progress bar 508, the second UI or the preview window 509 is streamed in an overlay mode over the first UI or the web browser 502 and is typically located over the progress bar 508 on the first UI or the web browser 502.

The rendering unit 301 may enable the user to rotate the multimedia content instantly at different angles while the multimedia content is being rendered within the second UI. As such, the UIU 307 may provide at least one predefined list of viewing angles to rotate the multimedia content instantly and for fast access of the multimedia content. In one implementation, the predefined list of viewing angles may include a default viewing angle or front viewing angle, a back viewing angle, a left viewing angle, a right viewing angle, a top viewing angle, and a bottom-viewing angle. In addition, the rendering unit 301 may enable the user to provide a user-defined angle manually. Accordingly, the rendering unit 301 can provide a GUI control element on the first UI for accessing the at least one predefined list of viewing angles and for providing the user-defined angle. Examples of the GUI control element include, but are not limited to, a button, an icon, a widget, and a context menu accessed upon user action, such as a right-click. For example, as illustrated in FIG. 5B, the UIU 307 may provide a first GUI control element 510 on the second UI or the preview window 509.

Accordingly the input receiving unit 308 may receive a command to change a viewing angle of the multimedia content within the second UI. The command may include information pertaining to at least one second viewing angle.

In one implementation, the command is indicative of a selection of a viewing angle from the predefined list of viewing angles. In such an implementation, the user can select an angle via the GUI control element provided on the second UI. As described earlier, the selection can be provided via a touch-based input or a non-touch-based input. The selection can be provided by using an input device such as a mouse, a keyboard, a joystick, and a stylus communicatively coupled with the electronic device 300 or by using a voice recognition module.

In another implementation, the command is a manual user-input. In such an implementation, the user can provide the user-defined angle manually via the GUI control element provided on the second UI. The user-input can be provided via a touch-based input or a non-touch-based input. The user-input can be provided by using an input device such as a mouse, a keyboard, a joystick, and a stylus communicatively coupled with the electronic device 300 or by using a voice recognition module.

Upon receiving the selection, the MCPU 304 instantly changes the viewing angle of the multimedia content to the selected viewing angle. The MCPU 304 may then render the multimedia content at the selected viewing angle as a preview on the second UI on the display 302 and the DCU 306 may stream the preview on the display 302. The preview of the multimedia content is an angular view of the multimedia content at the selected viewing angle. Thus, the MCPU 304 may not render a complete frame of the multimedia content depicting all the viewing angles of the multimedia content. Rather, the MCPU 304 may only render one angular view of the multimedia content. This enables the user to watch angular views of the multimedia content at multiple different angles in two different UIs, the first UI and the second UI. In addition, the two different UIs include GUI control elements to select different viewing angles, thereby providing separate controls for the multimedia content on the different UI.

In one implementation, the user-input for rendering the multimedia content within the second UI is indicative of mirroring (also known as screen-casting) the multimedia content at the first viewing angle on a different device. In such an implementation, the user-input can be a touch-based gesture input or a non-touch-based gesture input indicative of a mirroring (also known as screen-casting) functionality.

Referring to FIG. 3B, upon receiving the user-input, the DCU 306 may stream the second UI on a display 309 of a device 310 communicatively coupled with the electronic device 300 over the network. The device 310 can be either a handheld device or a secondary device. Examples of the handheld device include, but are not limited to, a smart phone and a personal digital assistance (PDA). Examples of the secondary device include, but are not limited to, a multimedia playback device, a smart TV, a smart glass, a tablet, and a display device such as a projection screen.

In such an implementation, the device 310 may also include a rendering unit 311 to render the multimedia content at different viewing angles. Accordingly, the rendering unit 311 also includes an MCDU 312, an MCPU 313, a DCU 314, and UIU 315. The rendering unit 311 may further enable the user to rotate the multimedia content instantly at different angles while the multimedia content is being rendered on the second UI on the display 309. As such, the rendering unit 311 may provide at least one predefined list of viewing angles to rotate the multimedia content instantly, in a manner similar to the rendering unit 301.

The device 310 may further include an input receiving unit 316 to receive the command to view the multimedia content at different viewing angles. Upon receiving the command, the rendering unit 311 may rotate the multimedia content and render the multimedia content in accordance with the different viewing angles as a preview within the second UI on the display 309. As described above, the preview of the multimedia content is an angular view of the multimedia content at the selected viewing angle.

Further, the multimedia content can be played or rendered on different UIs at different angular views either 'in sync' mode or 'out of sync' mode. The modes can be provided by the UIU 307, 315.

Further, the user can swap a viewing angle of the different UIs. In addition, the user can control viewing angle of the different UIs from any corresponding electronic device. As would be understood, the user-input can be either a touch input, a touch based gesture, a non-touch based gesture, a manual input, or a combination thereof. The user-input can be provided using an input device such as a mouse, a keyboard, a joystick, and a stylus communicatively coupled with the electronic device 300 or the device 310. Thus, the input receiving unit 308, 316 are capable of detecting the user-input and classifying as per the above mentioned function.

Further, as illustrated in FIG. 3A, the electronic device 300 may include the memory 317. The memory 317 may be a main memory, a static memory, or a dynamic memory. The memory 317 may store various programs and data necessary for the operation of the electronic device 300. The memory 317 in this disclosure may include, but is not limited to, a read only memory (ROM) or a random access memory (RAM) in the at least one processor, or a memory card mounted in the electronic device 300.

The electronic device 300 may further include a processor 318. The processor 318 may be one or more general processors, digital signal processors, application specific integrated circuits, field programmable gate arrays, servers, networks, digital circuits, analog circuits, combinations thereof, or other now known or later developed devices for analyzing and processing data. The processor 318 may control the overall operation of the electronic device 300 using the various programs stored in the memory 317. The memory 317 may be accessed by the processor 318, and the processor 317 may read/record/correct/delete/update data with respect to the memory 317. The processor 318 may control the rendering unit 301.

In one implementation, the rendering unit 301 is external to the processor 318, as illustrated in the FIG. 3A. In another implementation, the rendering unit 301 is integral to the processor 318. In another implementation, the MCDU 303, the MCPU 304, the DCU 306, and the UIU 307 can be one single unit. In another implementation, the MCDU 303, the MCPU 304, the DCU 306, and the UIU 307 can be different units, as illustrated in FIG. 3A. In another implementation, the rendering unit 301 is implemented as specific hardware elements. In another implementation, the rendering unit 301 is implemented as a combination of hardware and software elements. In yet another implementation, the rendering unit 301 is implemented as software elements such as a mobile application and plug-in to web browsers accessed via the electronic device 300.

The processor 318 may control the display 302 to display multimedia content with a 360-degree angle of view at a first viewing angle, and display, on the multimedia content, a first UI element to gradually change and display a viewing angle of the multimedia content and a second UI element to change and display a viewing angle of the multimedia content to a second viewing angle such that, in response to the second UI element being selected, control the display 302 to display a viewing angle option list to select one of a plurality of predefined viewing angles.

The viewing angle option list may further include a viewing angle option by a user defined setting.

The processor 318, in response to a viewing angle option being selected by the user defined setting, may control the display 302 to display a window for editing a horizontal viewing angle and a vertical viewing angle of the multimedia content.

The processor 318 may control the display 302 to display a preview screen of the multimedia content on one area of the display, by a user input, such that the preview screen of the multimedia content includes a third UI element to gradually change and display a viewing angle of the preview screen and a fourth UI element to change and display a viewing angle of the preview screen to a predetermined viewing angle, and change and display a viewing angle of the preview screen on the one area according to a user command which is input using the third UI element and the fourth UI element.

The processor 318 may control the display 302 to display, on the multimedia content, a sharing UI element for sharing the multimedia content of at least one viewing angle with another electronic apparatus.

The processor 318, when the sharing UI element is selected, may control the display 302 to display a list including a plurality of sharing modes.

The plurality of sharing modes may include a first sharing mode for providing a default viewing angle, a second sharing mode for providing a viewing angle preferred by a user based on information of a viewing angle according to reproduction history of multimedia content rendered on the display, and a third sharing mode for providing a viewing angle of multimedia content which is set by a user.

The processor 318, in response to the first sharing mode being selected, may control the display 302 to display current viewing angle information of the multimedia content as a notification message.

The processor 318 may generate the second sharing mode information by storing a sequence of a viewing angle and related timing information in a memory based on a user operation while the multimedia content is being rendered in the first area.

The processor 318, in response to the third sharing mode being selected, may control the display 302 to display a vertical angle and a horizontal angle of the current viewing angle of the multimedia content and an editing window including a timestamp, store angle and time information which is edited in the editing window by a user, and transmit the stored information to a different electronic apparatus.

The processor 318 may transmit the changed viewing angle information to the different electronic apparatus to display the multimedia content corresponding to the changed viewing angle of the preview screen on a display of the different electronic apparatus.

In a similar manner, in one implementation, the rendering unit 311 is implemented as specific hardware elements in the device 310. In another implementation, the rendering unit 311 is implemented as a combination of hardware and software elements in the device 310. In yet another implementation, the rendering unit 311 is implemented as software elements such as a mobile application and plug-in to web browsers accessed via the device 310.

The electronic device 300 may further include another input/output unit (not shown) for receiving and outputting data. The electronic device 300 may include a communication interface unit (not shown) to communicatively couple the rendering unit 301 with any other device over the network. The various units of the electronic device 300 can communicate via a bus (not shown).

For the ease of understanding, the forthcoming description of FIGS. 4A to 4C and 5A to 5J illustrate various implementations of the disclosure, as described in reference to FIGS. 3A and 3B above. However, it may be strictly understood that the forthcoming examples shall not be construed as being limitations towards the present disclosure and the present disclosure may be extended to cover analogous manifestations through another type of like mechanisms.

Figure 4C:
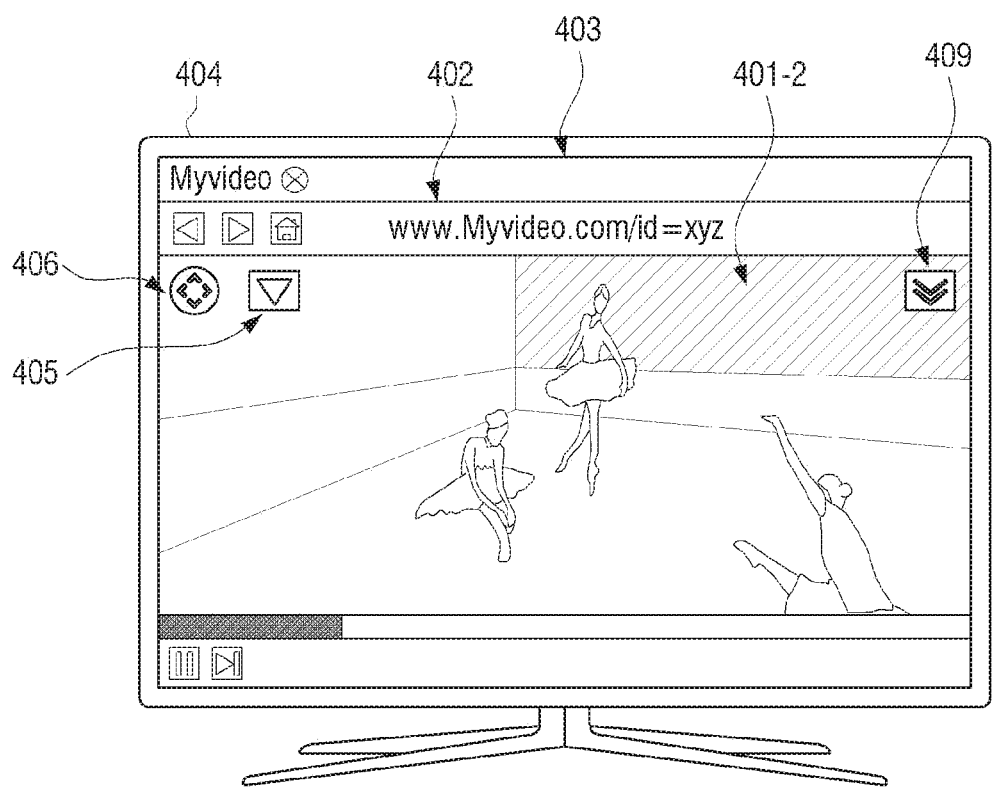

FIGS. 4A to 4C illustrate first examples of rendering the multimedia content according to various embodiments of the present disclosure.

Referring to FIG. 4A, an example reference complete frame 401 of an example 360° multimedia content is shown.

Referring to FIG. 4B, the multimedia content at a first angle 401-1 is rendered via the web browser 402 on the display 403 of the electronic device 404. For the sake of brevity and understanding, reference numeral 401 on left side of the hyphenated number of the first angle 401-1 represents the reference complete frame of the multimedia content and the reference numeral 1 on right side of the hyphenated number of the first angle 401-1 represents the first angle. The web browser 402 may represent the first UI. The electronic device 404 may include the rendering unit 301 that provides the first GUI control element 405 to enable a changing of a viewing angle of the multimedia content instantly, as described with reference to FIG. 3A. In addition, the rendering unit 301 may also provide the second GUI control element 406 to enable a changing of a viewing angle of the multimedia content gradually. In the example, the first and second GUI control elements 405, 406 are represented as a button on the first UI. In another example, the first and second GUI control elements 405, 406 can be provided as a context menu upon a 'right-click' of a mouse. In another example, the first and second GUI control elements 405, 406 may be represented as an icon on the first UI.

Upon accessing the first GUI control element 405, the rendering unit 301 may display a UI 407 on the web browser 402. The UI 407 provides an option to select a viewing angle from a predefined list of viewing angles and an option to provide a user-defined angle manually. The first GUI control element 405 can be accessed via any mechanism such as a touch based gesture, a non-touch based gesture, a manual user-input, and via any input device such as a remote control, a mouse, and a stylus.

Upon selecting the option to select a viewing angle from a predefined list of viewing angles, the rendering unit 301 may display another UI 408 on the web browser 402. The other UI 408 may display the different predefined viewing angles such as a default viewing angle or front viewing angle, a back viewing angle, a left viewing angle, a right viewing angle, a top viewing angle, and a bottom-viewing angle.

On the contrary, upon selecting the option to provide a user-defined angle manually, the rendering unit 301 may provide a text field (not shown) to enable the user to provide an angle manually. The electronic device 404 may further include the input receiving unit 308 to receive either the selection of a viewing angle from the predefined list of viewing angles in the other UI 408 or the user-defined angle in the UI 407.

Referring to FIG. 4C, upon receiving the selection of the viewing angle in the other UI 408, as illustrated in FIG. 4B, the rendering unit 301 may instantly rotate (or switch) the multimedia content to the selected viewing angle and render the multimedia content at the selected angle 401-2 on the display 403 via the web browser 402.

Further, as illustrated in FIGS. 4B and 4C, the electronic device 404 may provide a GUI control element 409 to share the multimedia content at one or more viewing angles, as will be explained later. In the example, the GUI control element 409 is represented as a button on the UI. In another example, the GUI control element 409 can be provided as a context menu upon a 'right-click' of a mouse. In another example, the GUI control element 409 is represented as an icon on the UI.

FIGS. 5A to 5J illustrate second examples of rendering the multimedia content according to various embodiments of the present disclosure. In the example, the reference complete frame 401 illustrated in FIG. 4A is referred to.

Figure 5A:
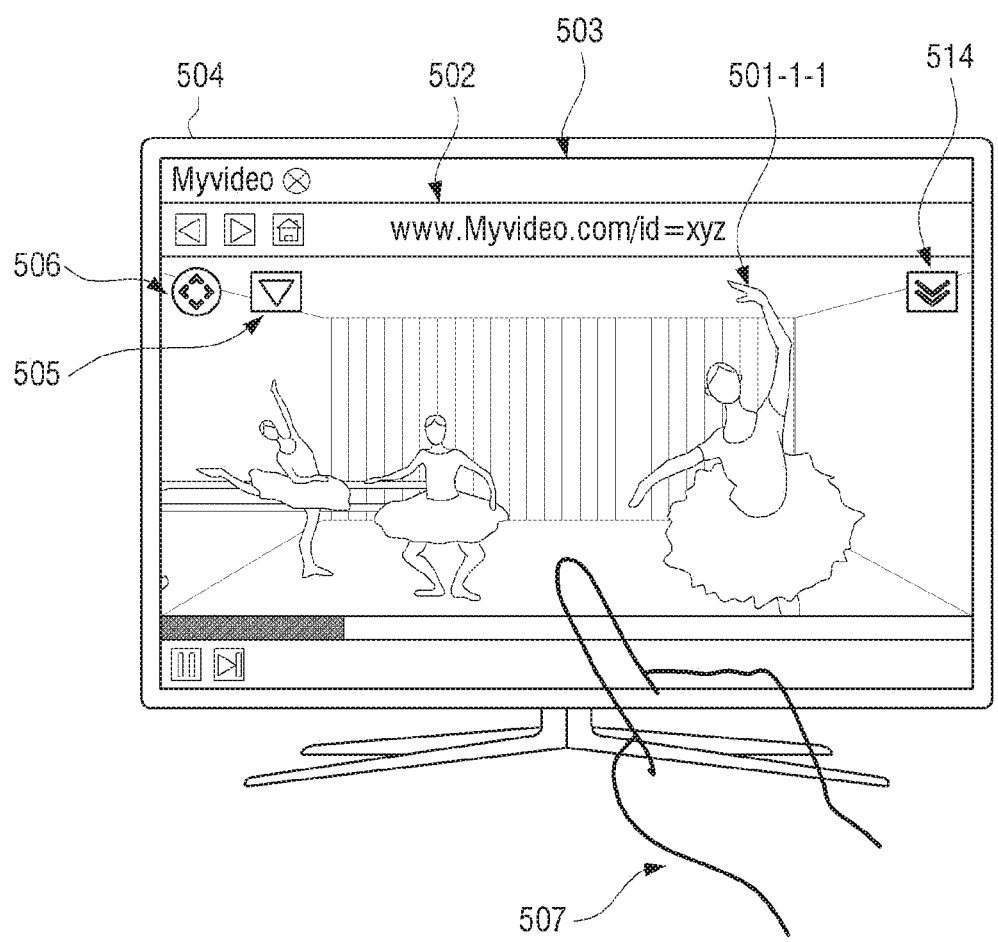
FIGS. 5A, 5B, 5C, 5D, 5E, 5F, 5G, 5H, 5I, and 5J illustrate second examples of rendering 360-degree multimedia content according to various embodiments of the present disclosure.
Figure 5B:
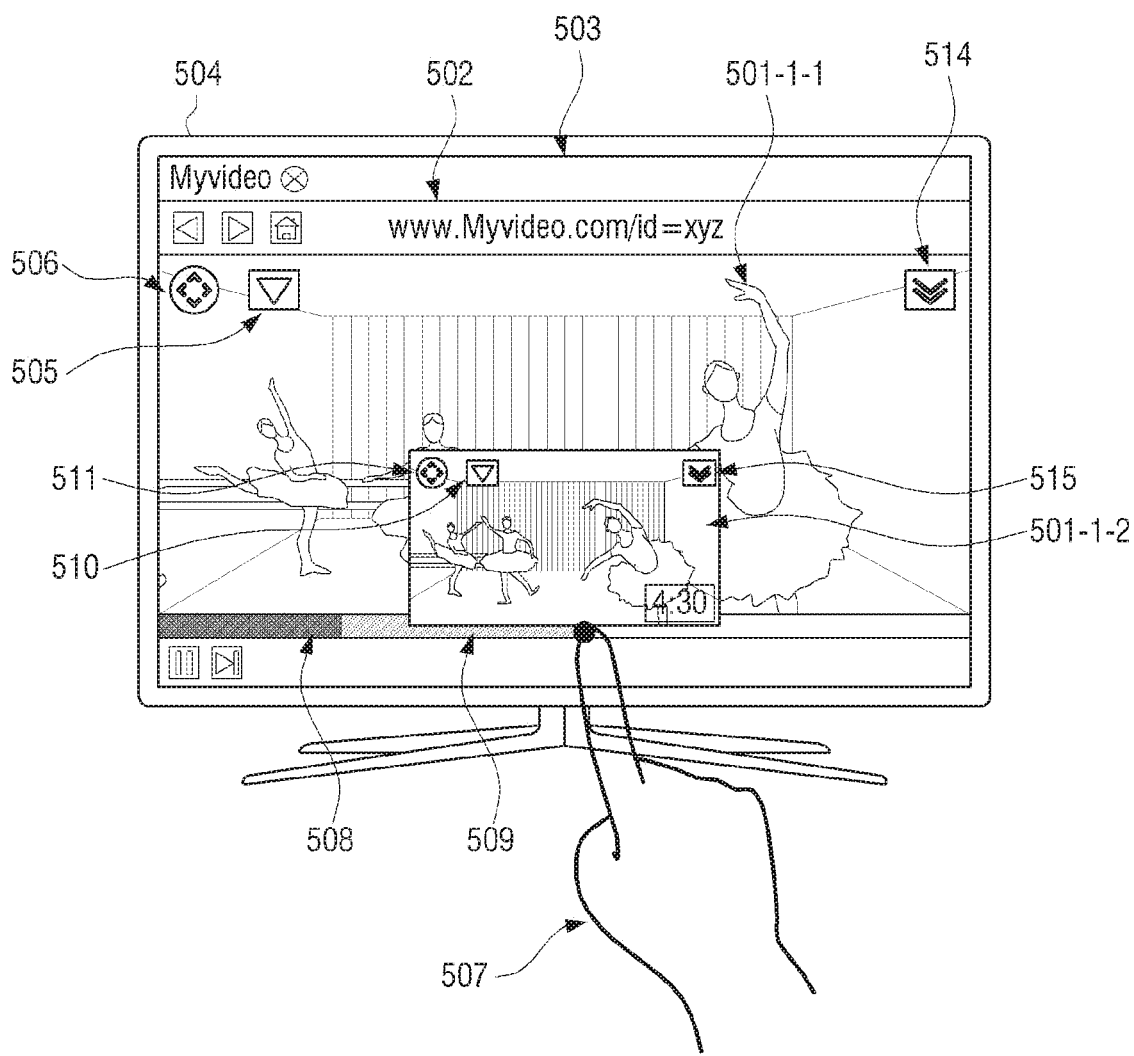

Referring to FIG. 5A, the multimedia content at a first angle and at a first time instance 501-1-1 is rendered via the web browser 502 on the display 503 of the electronic device 504. For the sake of brevity and understanding, the reference numeral 501 on left side of the hyphenated reference character 501-1-1 represents the multimedia content, the first reference numeral 1 on right side of the hyphenated reference character 501-1-1 represents the first angle, and the second reference numeral 1 on the further right side of hyphenated reference character 501-1-1 represents the first time instance. The web browser 502 represents the first UI. The electronic device 504 includes the rendering unit 301 that provides a first GUI control element 505 to change a viewing angle of the multimedia content instantly, as described with reference to FIG. 3A. In addition, the rendering unit 301 also provides a second GUI control element 506 to enable a changing of a viewing angle of the multimedia content gradually. In the example, the first and second GUI control elements 505, 506 are represented as buttons on the first UI. In another example, the first and second GUI control elements 505, 506 can be provided as a context menu upon a 'right-click' of a mouse. In another example, the first and second GUI control elements 505, 506 may be represented as an icon on the first UI. The electronic device 504 further includes the input receiving unit 308 to receive the user-input 507 to render the multimedia content 501 on a second UI.

For example, referring to FIG. 5B, the user-input 507 corresponds to pointing and/or selecting a portion on the progress bar 508 on the web browser 502. The pointed and/or selected portion is indicative of a specific time instance and/or frame of the multimedia content. In one example, the specific time instance and/or frame can be the same as current time instance and/or frame of the multimedia content that is being rendered on the web browser 502. In another example, the specific time instance and/or frame can be different from current instance and/or frame of the multimedia content that is being rendered on the web browser 502. By default, the selected portion can be indicative of a different time instance and/or frame of the multimedia content at a current angle. In one example, the rendering unit 301 may provide an option to the user to set any angle as a default angle such that the selected portion is indicative of a different time instance and/or frame of the multimedia content at the default angle.

Upon pointing and/or selecting the portion on the progress bar 508, the rendering unit 301 in the electronic device 504 renders the multimedia content at the first viewing angle but at a second time instance 501-1-2 on the preview window 509. The preview window 509 is streamed in an overlay mode on the first UI and is located above the progress bar 508. The rendering unit 301 further provides the first GUI control element 510 and a second GUI control element 511 to change the viewing angle of the multimedia content 501 in the preview window 509, in a manner as described above.

Figure 5C:
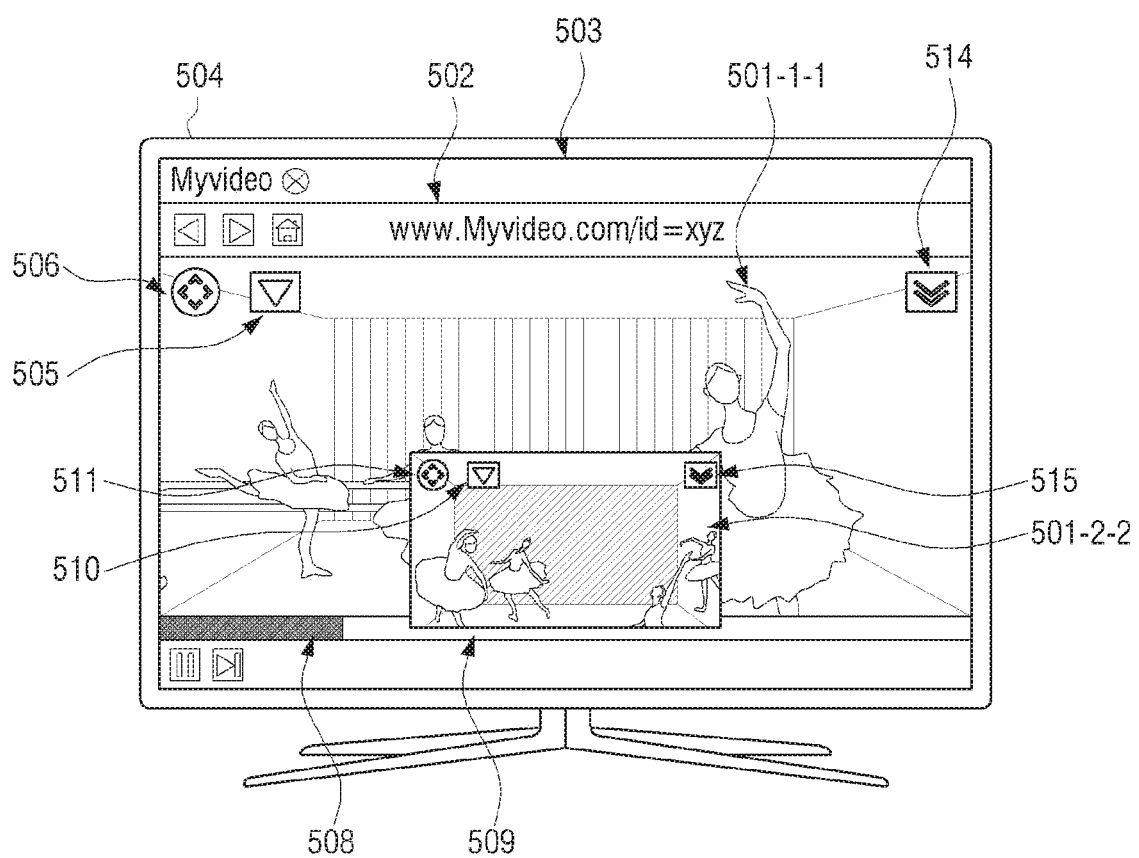
Figure 5D:
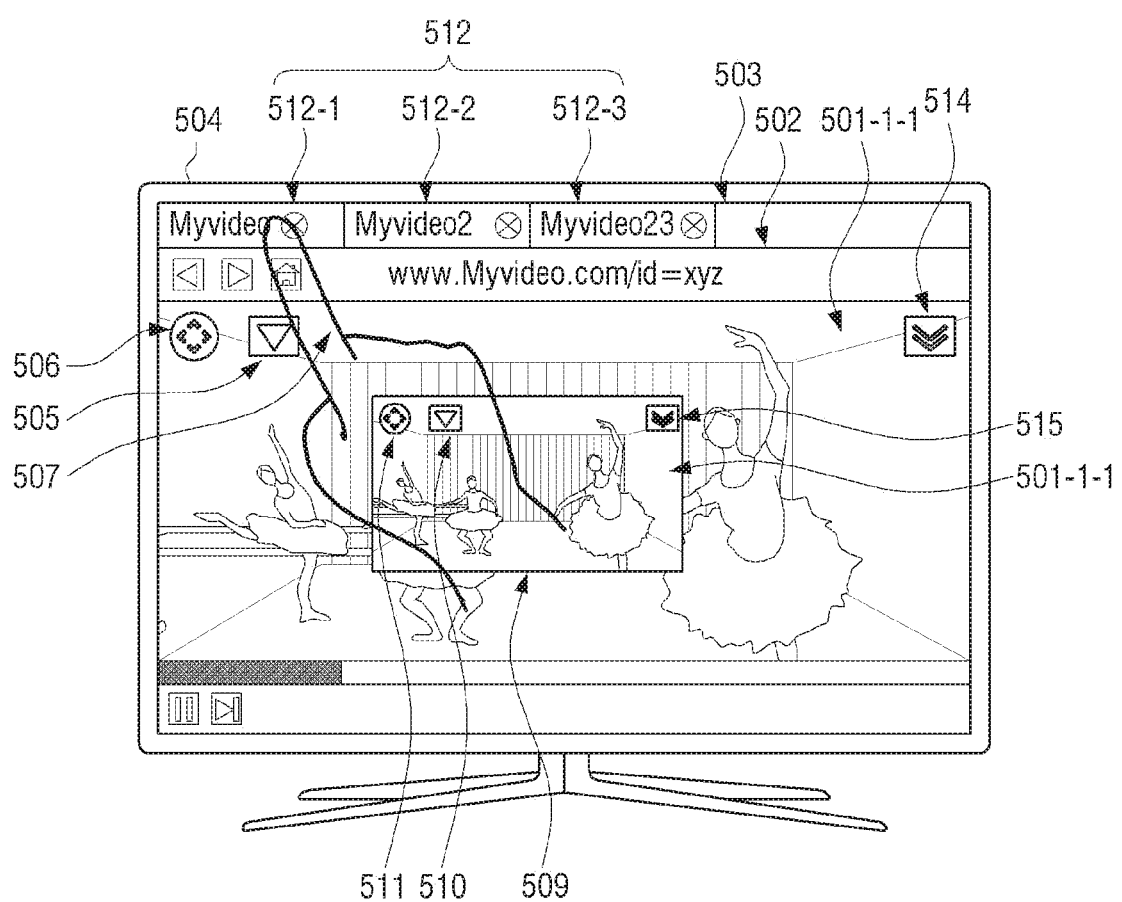

Referring to FIG. 5C, upon receiving the selection of the viewing angle via the first GUI control element 510 or the second GUI control element 511, the rendering unit 301 rotates the multimedia content 501 to the selected viewing angle. In addition, the input receiving unit 308 may receive a different time instance and/or frame at the selected viewing angle. The rendering unit 301 then renders the multimedia content at the selected angle and at a time instance and/or frame 501-2-2 in the preview window 509 on the display 503. Thus, the same multimedia content is being rendered at different angles in the web browser and the overlay preview window 509 simultaneously along with separate controls.

Further, the web browser 502 may be associated with a tab. In addition, the web browser 502 may display other tabs rendering multimedia content. As would be understood, the tab in which the web browser 502 is currently rendering multimedia content is termed as an active tab, and the other tabs are terms as in-active tabs.

Referring to FIG. 5D, in another implementation, the user-input 507 corresponds to accessing an active tab 512-1 associated with the web browser 502. The web browser 502 may include in-active tabs 512-2, 512-3. Upon accessing the active tab 512-1, the rendering unit 301 in the electronic device 504 renders the multimedia content at the first angle and at the first time instance 501-1-1 on the preview window 509 in an overlay mode. In an example, the preview window 509 may be located just below the active tab 512-1. In another example, the preview window 509 may be located at centre of the first UI or the web browser 502. The rendering unit 301 further provides the first GUI control element 510 and the second GUI control element 511 to change a viewing angle of the multimedia content 501 in the preview window 509, as described above.

Figure 5E:
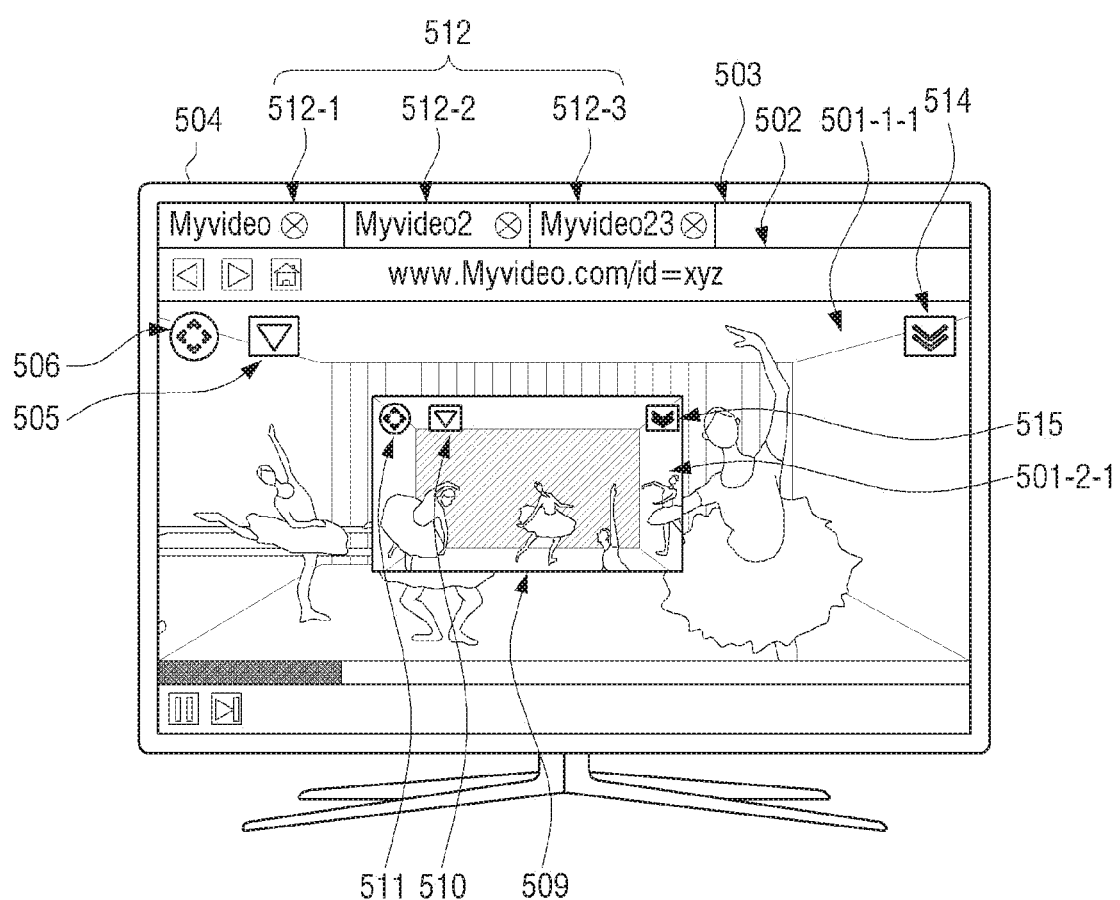

Referring to FIG. 5E, upon receiving the selection of the viewing angle via the first GUI control element 510 or the second GUI control element 511, the rendering unit 301 rotates the multimedia content 501 to the selected viewing angle. The rendering unit 301 renders the multimedia content at the selected angle 501-2-1 in the preview window 509 on the display 503. Thus, the same multimedia content is being rendered at different angles in the web browser and the preview window 509 simultaneously along with separate controls.

Figure 5F:
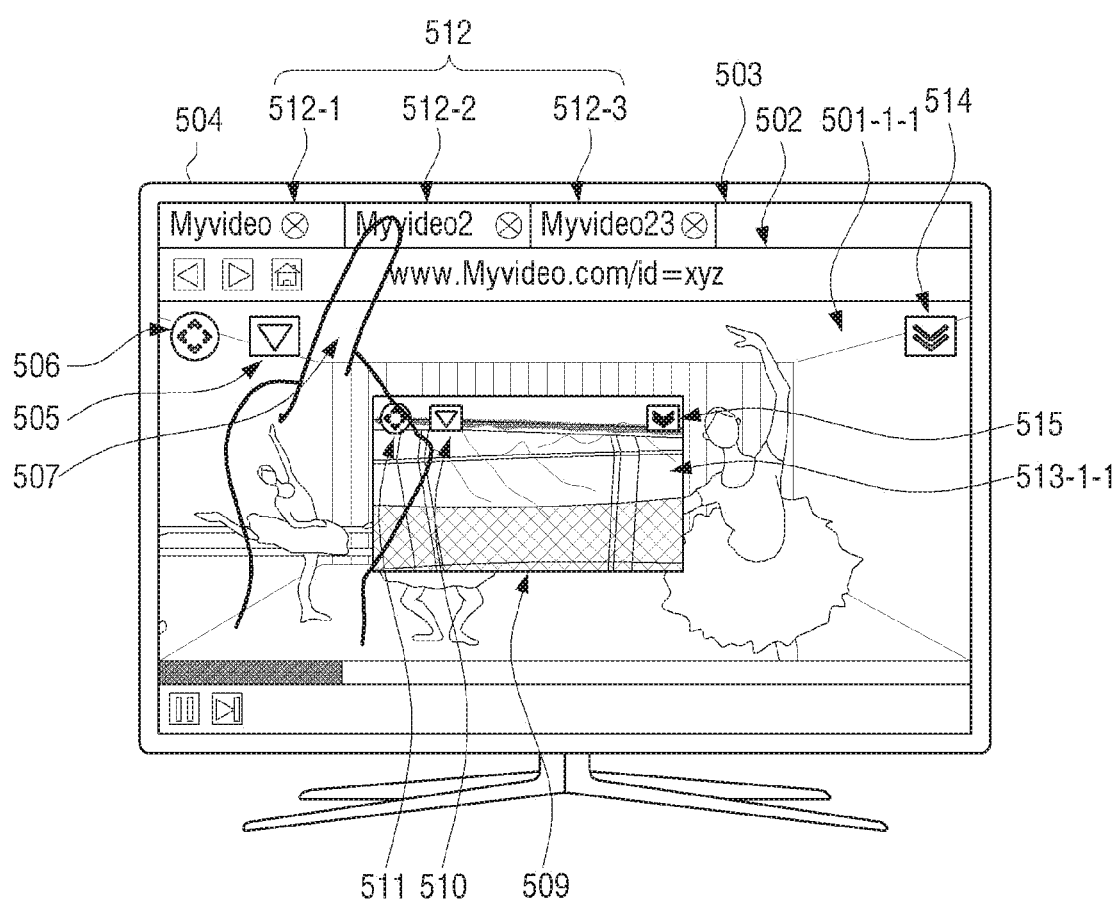

Referring to FIG. 5F, in another implementation, the user-input 507 corresponds to accessing the in-active tab 512-2. The in-active tab 512-2 may correspond to different multimedia content that can be rendered via the web browser 502. Upon accessing the in-active tab 512-2, the rendering unit 301 in the electronic device 504 renders multimedia content at a first angle and at a first time instance 513-1-1 on the preview window 509 in an overlay mode, as described above. Thus, the user can interact with two different multimedia contents being rendered at different angles in the web browser and the preview window 509 simultaneously along with separate controls.

Figure 5G:
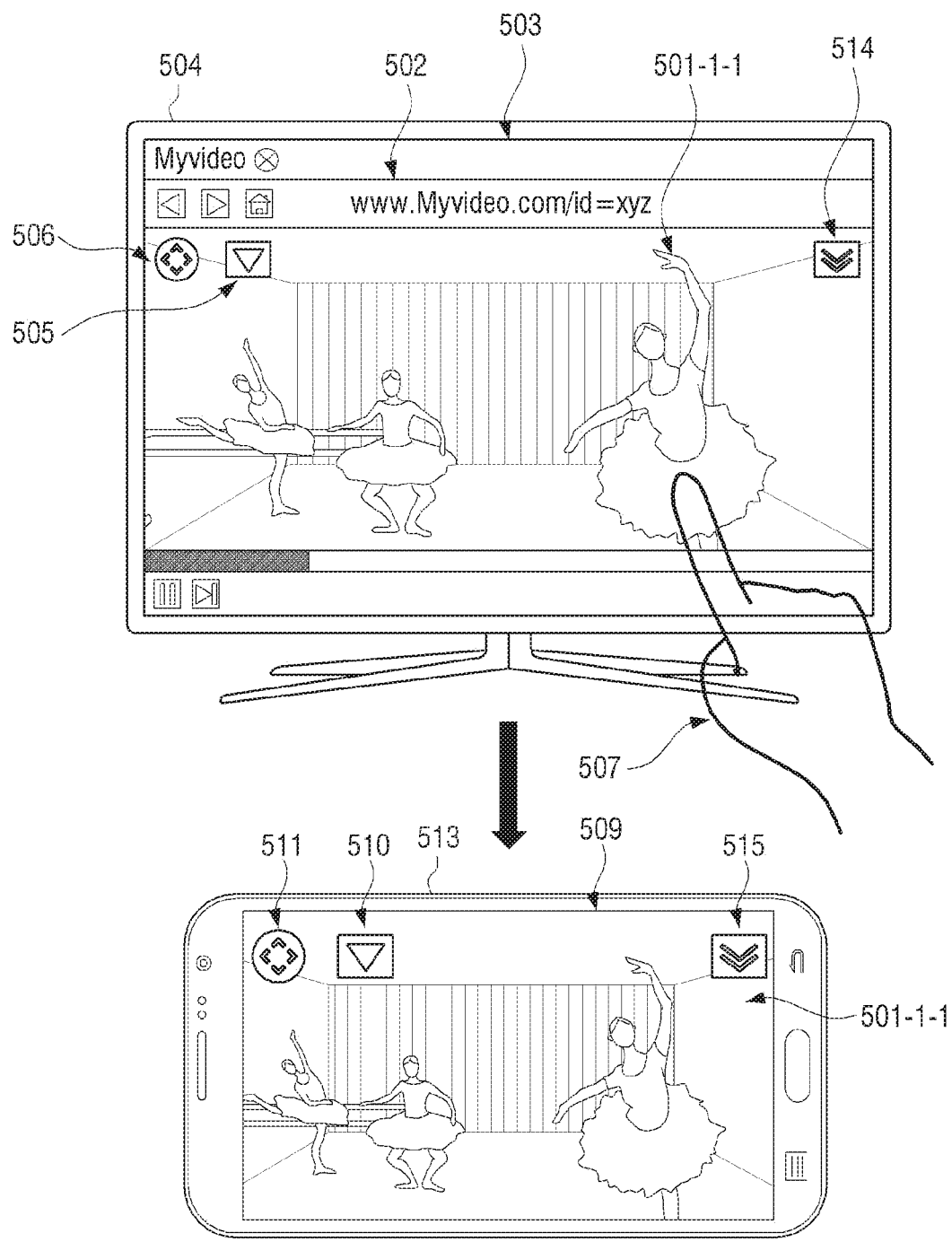

Referring to FIG. 5G, in another implementation, the user-input 507 corresponds to mirroring (also known as screen casting) the multimedia content 501 on a handheld device 513. In an example, the user-input 507 is a right flick gesture. It would be understood that the mirroring or screen-casting functionality is not limited to a handheld device. The multimedia content 501 can be mirrored or casted to any electronic device capable of supporting the mirroring or screen-casting functionality. Upon receiving the user-input 507, the rendering unit 301 in the electronic device 504 renders the multimedia content at the first angle and at the first time instance 501-1-1 on a display of the handheld device 513 that acts as the preview window 509. The rendering unit 301 further provides the first GUI control element 510 and the second GUI control element 511 to change a viewing angle of the multimedia content 501 in the preview window 509. As described earlier, the handheld device 513 may include the rendering unit 311 and the input receiving unit 316.

Figure 5H:
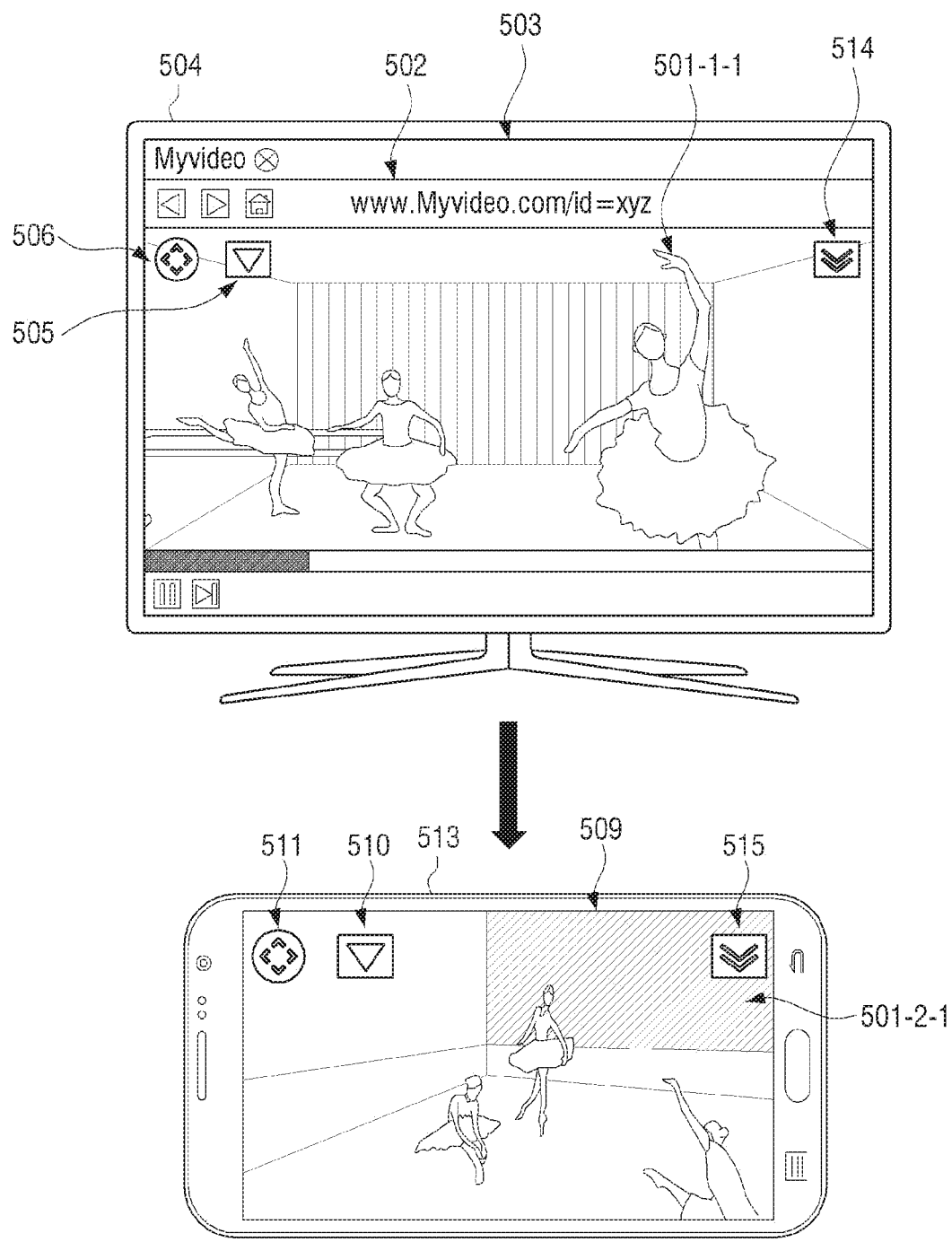

Referring to FIG. 5H, upon receiving the selection of the viewing angle via the first GUI control element 510 or the second GUI control element 511, the rendering unit 301 rotates the multimedia content 501 to the selected viewing angle. The rendering unit 301 renders the multimedia content at the selected angle 501-2-1 in the preview window 509 on the display unit of the handheld device 513. Thus, the same multimedia content is being rendered at different angles on two different devices simultaneously along with separate controls.

Figure 5I:
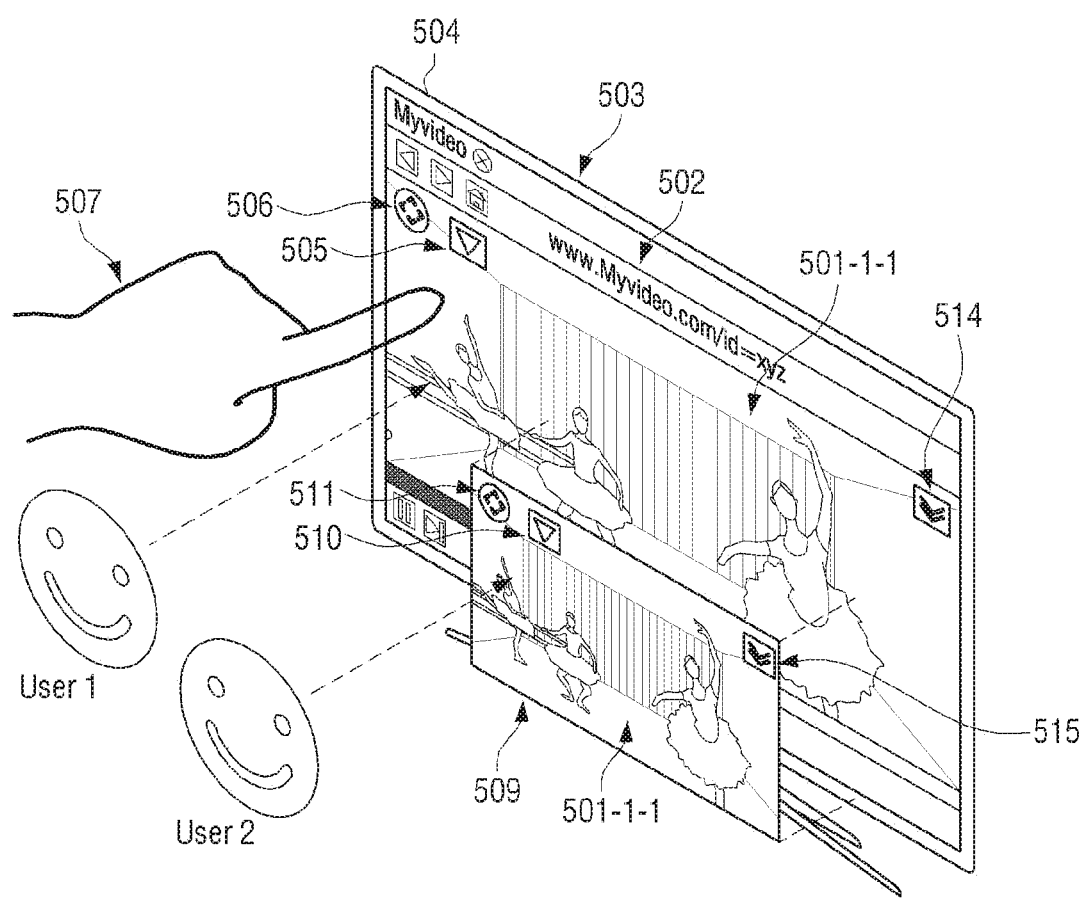

Referring to FIG. 5I, in another implementation, the user-input 507 corresponds to viewing the multimedia content 501 in a multi-view/multi-user mode. In an example, the user-input 507 is a left flick gesture. It would be understood that the multi-view/multi-user mode viewing functionality is not limited to same multimedia content. Different multimedia content, as described with reference FIG. 5F, can also be viewed using the multi-view/multi-user mode viewing functionality. Upon receiving the user-input 507, the rendering unit 301 in the electronic device 504 renders the multimedia content at the first angle and at the first time instance 501-1-1 on the preview window 509. Thus, in such an implementation, user 1 can view the first UI or the web browser 502 and user 2 can view the preview window 509. The rendering unit 301 further provides the first GUI control element 510 and the second GUI control element 511 to change a viewing angle of the multimedia content 501 in the preview window 509, as described above. For the sake of brevity, only two users are shown in the multi-view and/or multi-user mode.

Figure 5J:
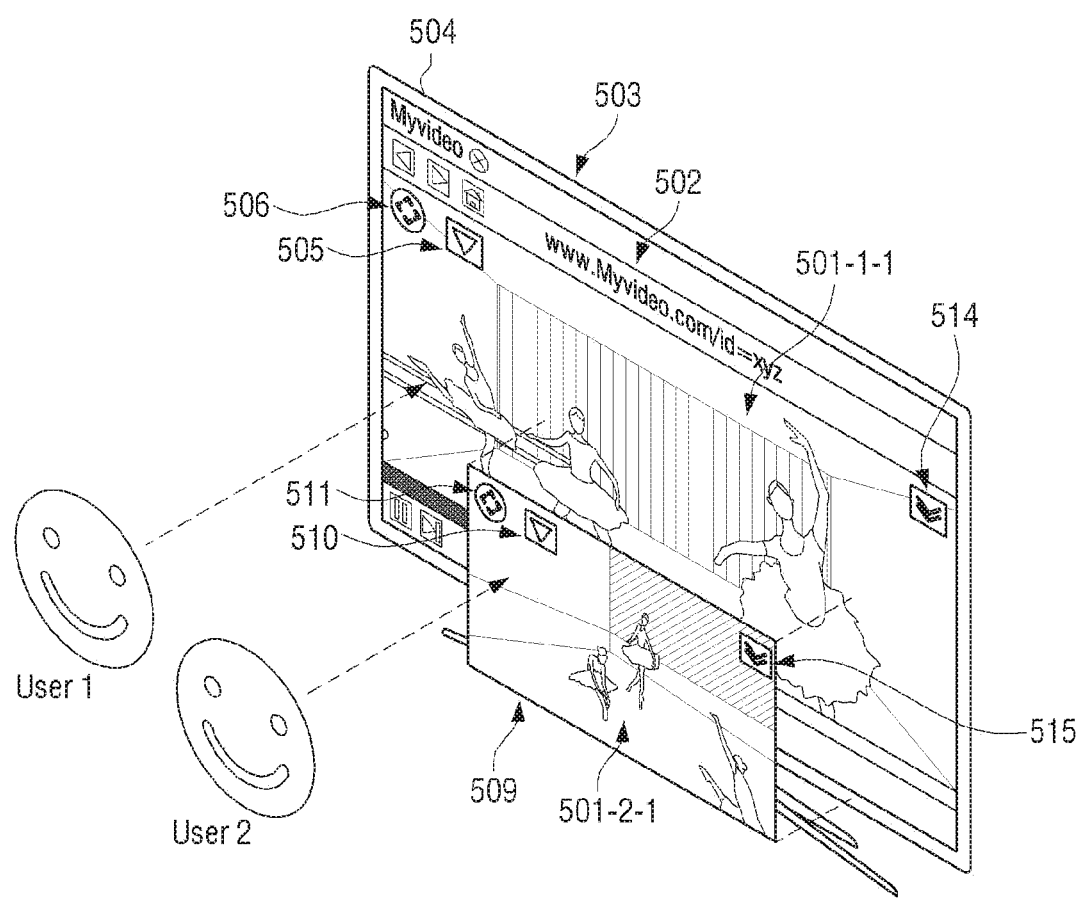

Referring to FIG. 5J, upon receiving the selection of the viewing angle via the first GUI control element 510 or the second GUI control element 511, the rendering unit 301 rotates the multimedia content 501 to the selected viewing angle. The rendering unit 301 renders the multimedia content at the selected angle 501-2-1 in the preview window 509 on the display 503. Thus, the same multimedia content is being rendered at different angles in the first UI or the web browser 502 and the preview window 509 in multi-view mode simultaneously along with separate controls.

Further, as illustrated in FIGS. 5A to 5J, the electronic device 504 may provide a third GUI control element 514 on the first UI or the web browser 502 to share the multimedia content at one or more viewing angles, as will be explained below. Likewise, as illustrated in FIGS. 5B to 5J, the electronic device 504 may provide a third GUI control element 515 on the preview window 509 to share the multimedia content at one or more viewing angles. In the example, the third GUI control element 514, 515 is represented as a button on the UI. In another example, the third GUI control element 514, 515 can be provided as a context menu upon a 'right-click' of a mouse. In another example, the third GUI control element 514, 515 is represented as an icon on the UI.

Figure 6:
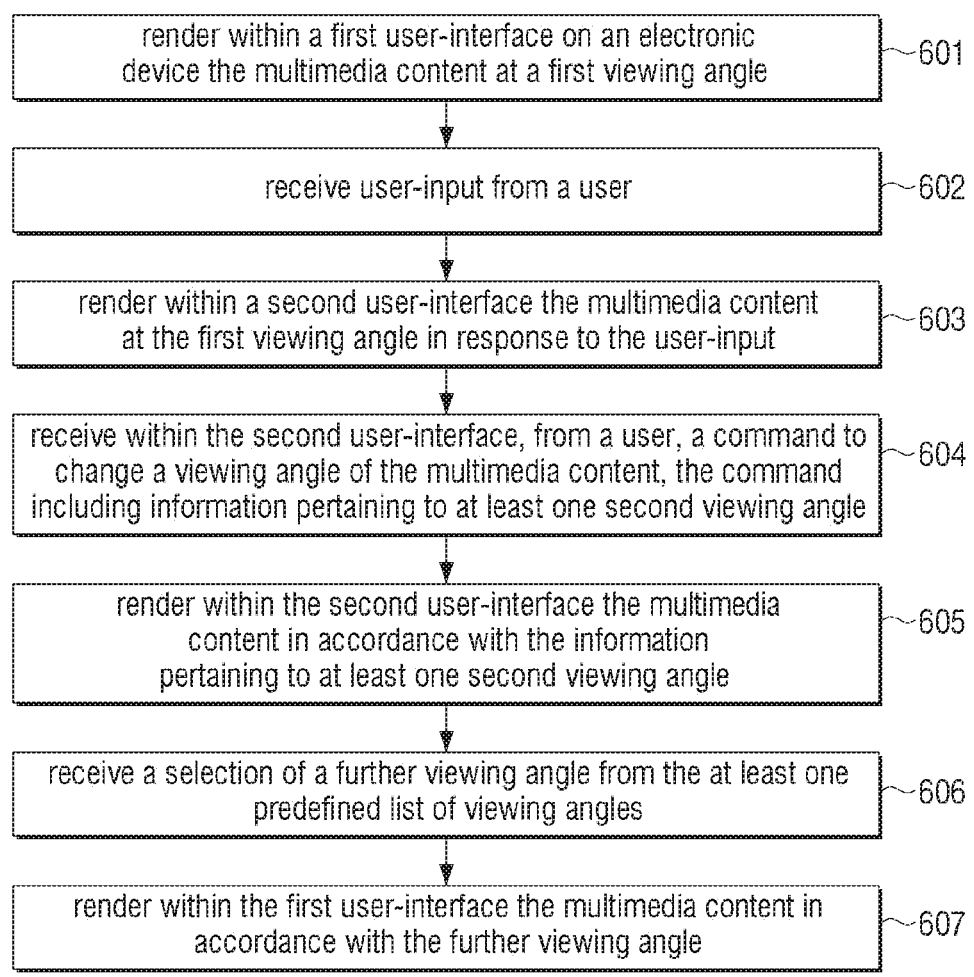
FIG. 6 illustrates a method for rendering 360-degree multimedia content according to an embodiment of the present disclosure.

FIG. 6 illustrates a method for rendering a 360-degree multimedia content according to an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

Referring to FIG. 6, at operation 601, the multimedia content is rendered within a first UI on an electronic device at a first viewing angle. For example, the rendering unit 301 displays the multimedia content at first angle on the display 302 of the electronic device 300.

At operation 602, a user-input is received from a user. The user-input can be indicative of selecting a portion on a progress bar, accessing a tab on a web browser, accessing a URL, accessing a folder, and mirroring and/or casting the multimedia content on a different device. For example, the input receiving unit 308 receives the user-input.

At operation 603, the multimedia content is rendered within a second UI at the first viewing angle in response to the user-input. For example, the rendering unit 301 displays the multimedia content at the first angle on the display.

At operation 604, a command to change a viewing angle of the multimedia content is received from the user within the second UI. The command includes information pertaining to at least one second viewing angle. For example, the input receiving unit 308 receives the command.

At operation 605, the multimedia content is rendered within the second UI in accordance with the information pertaining to at least one second viewing angle. The multimedia content is rendered as a preview in the second UI, the preview being an angular view of the multimedia content. For example, the rendering unit 301 rotates the multimedia content to the second angle and renders an angular view of the multimedia content on the second UI.

Thus, the multimedia content can be viewed at two different angles simultaneously.

Further, at operation 606, a selection of a further viewing angle from at least one predefined list of viewing angles provided on the first UI is received from the user. For example, the input receiving unit 308 receives the command to change the viewing angle.

At operation 607, the multimedia content is rendered within the first UI in accordance with the further viewing angle. For example, the rendering unit 301 rotates the multimedia content to the second angle and renders an angular view of the multimedia at the selected angle content on the first UI.

Thus, the viewing angles of multimedia content can be changed in both UIs and thereby provide a better user-experience.

Figure 7:
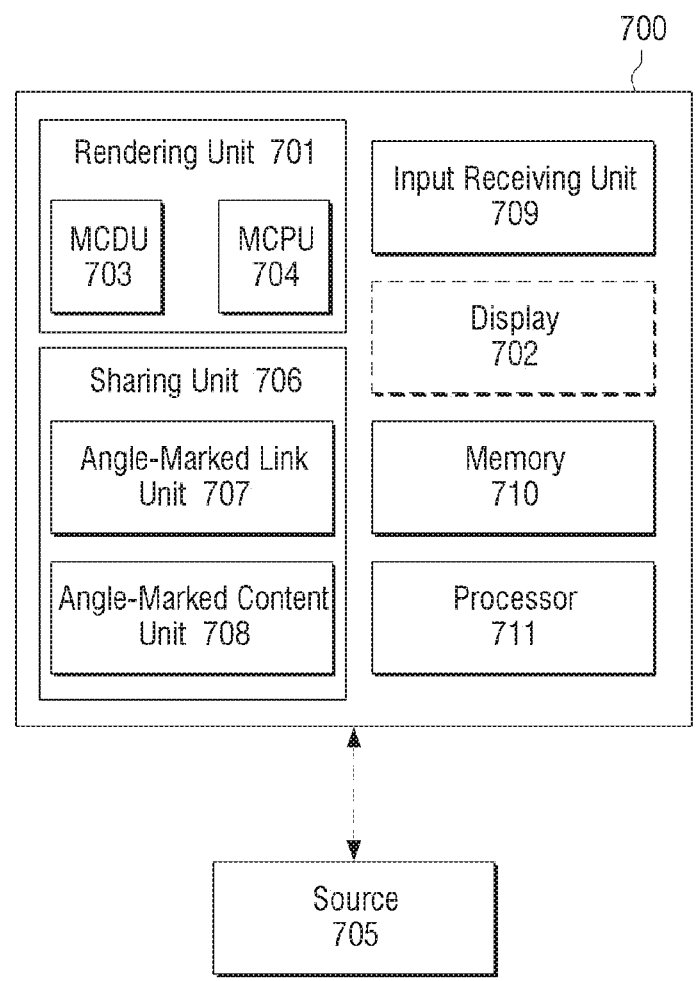
FIG. 7 illustrates an electronic device for rendering 360-degree multimedia content according to an embodiment of the present disclosure.

FIG. 7 illustrates an electronic device for rendering 360-degree multimedia content (hereinafter interchangeably referred to as multimedia content) according to an embodiment of the present disclosure.

Referring to FIG. 7, an electronic device 700 may include, but is not limited to, a smartphone, a desktop, a notebook, a projection screen, and a smart TV. The electronic device 700 includes a rendering unit 701 to render the multimedia content at a first viewing angle within a UI on a display 702 of the electronic device 700. In one example, the first viewing angle can be a default-viewing angle or base angle or a front viewing angle or 0 degree angle. In another example, the first viewing angle can be a viewing angle other than a default angle such as a left viewing angle or −90 degree angle. In one implementation, the display 702 is integral to the electronic device 700 and the UI can be a primary UI streamed on the electronic device 700. In another implementation, the display 702 is integral to the electronic device 700 and the UI can be a secondary UI streamed on the electronic device 700 as an overlay mode or a full screen mode, a picture-in-picture mode, a split screen mode, a multi view mode, and an augmented mode. Examples of such an implementation include a smart TV and a smart phone. As such, the rendering unit 701 can be the same as the rendering unit 301 of the electronic device 300 described in FIG. 3A, and accordingly enables viewing of the multimedia content at different angles.

The rendering unit 701 may include an MCDU 703 and an MCPU 704. The MCDU 703, upon receiving a request to view the multimedia content, receives compressed and/or encrypted multimedia content from a source 705 and decodes the multimedia content. In one example, the source 705 can be a web server and an application server coupled with the electronic device 700 over a network. In another example, the source 705 can be a storage such as a memory of the electronic device 700, a pen drive, and a compact disk. The network can be a wired network or a wireless network. The MCPU 704 then renders or plays the multimedia content in accordance with a viewing angle selected by a user. Further, the rendering unit 701 includes a display control unit (not shown) to stream the multimedia content in accordance with the selected viewing angle on the display 702. In one example, the multimedia content is rendered via a web browser on the display 702. In another example, the multimedia content is rendered via a video player application on the display 702. In addition, the display control unit streams the UI in accordance with a display mode, as described in reference to FIG. 3A. The display mode can be an overlay mode, a full screen mode, a picture-in-picture mode, a split screen mode, a multi view mode, and an augmented mode. Further, the rendering unit 701 may include a UI unit (not shown) to provide GUI control elements to enable the user to change viewing angles of the multimedia content, as described with reference to FIG. 3A.

Further, the electronic device 700 may include a sharing unit 706 to create and share, through a wired and/or a wireless network, a viewing mechanism with one or more recipients for viewing the multimedia content at different angles. The sharing unit 706 may include an angle-marked link unit 707 and an angle-marked content unit 708. The sharing unit 706 further provides different sharing modes such as a default sharing mode, a record sharing mode, and a manual sharing mode for sharing the multimedia content. In the default sharing mode, the multimedia content is shared at a current viewing angle of multimedia content. In the record sharing mode, the multimedia content is shared using one or more viewing angles that are recorded based on a user action on the multimedia content. As such, the sharing unit 706 records the sequence of the user action and determines the viewing angles. The sharing unit 706 may record related timing information based on user action while the multimedia content is being rendered. Examples of the user action include, but are not limited to, pausing, forwarding, rewinding, skipping a frame, varying playback speed, and rotating. The sharing unit 706 may record the angle information and related timing information in accordance with the sequence of the user action and create the angle-marked link. The sharing unit 706 may notify the angle-marked link on the display 702. The sharing unit 706 may notify the angle-marked link related to a user preferred playback section. In the manual sharing mode, the multimedia content is shared using one or more viewing angles that are provided based on a manual user-input. The electronic device 700 may further include an input receiving unit 709 to receive a command for sharing the multimedia content with the one or more recipients. The command can be received via a GUI control element provided by the sharing unit 706. Examples of the GUI control element include, but are not limited to, a button, an icon, a widget, and a context menu accessed upon a user action, such as a right-click on the display 702.

Further, the command is indicative of the sharing mode and includes information pertaining to one or more second viewing angles. Accordingly, upon accessing the graphical GUI control element, the user selects the sharing mode and consequently provides one or more second viewing angles. Upon receiving the sharing mode and the information pertaining to one or more second viewing angles, the sharing unit 706 creates and shares the viewing mechanism via one or more sharing applications. Examples of the sharing applications include, but are not limited to, chat applications, content sharing applications, a communication link, and email applications.

In one implementation, the viewing mechanism is an angle-marked link or a URL. In such an implementation, the multimedia content is rendered via a web browser on the display 702. Therefore, in such an implementation, the angle-marked link unit 707 obtains location information of the source 705 such as a web server and an application hosting or storing the multimedia content. The location information can be obtained using various techniques known in the art. The location information is provided as a base link. The base link indicates a default-viewing angle or a base angle or 0-degree angle at which the MCPU 704 renders the multimedia content on a display upon accessing the base link. In an example, the base link can be www.myvideo.com/id=xyz.

The angle-marked link unit 707 may modify the base link to create the angle-marked link by embedding the information pertaining to the one or more second viewing angles with the location information in the base link. Thus, the angle-marked link indicates the one or more second viewing angles such that the MCPU 704 renders the multimedia content at first of the one or more second viewing angles, instead of the default-viewing angle, on a display upon accessing the angle-marked link. In the above example, the second viewing angles can be a horizontal angle as 10-degrees and a vertical angle as 20-degrees. As such, the angle-marked link can be www.myvideo.com/id=xyz?ah=1-#av=20, in which 'ah' represents the horizontal angle and 'av' represents the vertical angle.

When the angle-marked link is shared and accessed, the MCPU 704 renders the multimedia content with a 10-degree horizontal offset (clockwise) and a 20-degree vertical offset (upward) from the base angle, i.e., 0-degree angle. The base link and the angle-marked link are two separate links such that either of the links can be shared via the sharing applications.

In another implementation, the viewing mechanism is an angle-marked content. In such an implementation, the multimedia content is stored in the source 705 such as a memory, a pen drive, and a compact disk and is rendered via a video player on the display 702. Therefore, in such an implementation, the angle-marked content unit 708 obtains a list of attributes associated with the multimedia content from the source 705. The list of attributes or metadata provide information about the multimedia content such as date of creation, title, author, security, keywords, and render type. The list also provides angle information as a default-viewing angle or a base angle or 0-degree angle at which the MCPU 704 renders the multimedia content on a display upon accessing the multimedia content.

The angle-marked content unit 708 then modifies the list of attributes to create the angle-marked content by appending the information pertaining to the one or more second viewing angles with the angle information. Thus, the angle-marked content indicates the one or more second viewing angles such that the MCPU 704 renders the multimedia content at first of the one or more second viewing angles, instead of the default-viewing angle, on a display upon accessing the angle-marked content.

In addition, the information pertaining to the one or more second viewing angles further includes at least one parameter related to rendering the multimedia content. The at least one parameter is indicative of: rendering duration, angle shifting duration, forward duration, backward duration, pause duration, frame skip, playback speed, variation in playback speed, and angle variation during rendering, and combination thereof. In one implementation, the at least one parameter is provided as a manual user-input. In another implementation, at least one parameter is recorded based on a corresponding user-action.

Thus, the angle-marked link unit 707 embeds at least one parameter with the location information along with information pertaining to the one or more second viewing angles. In one example, the multiple angle information is embedded for different rendering duration. As such, the angle-marked link can be www.myvideo.com/id=xyz?t=2m#d=5s#ah=10#av=20?t=5m#ah=25#av=30.

Accordingly, upon accessing the angle-marked link, the MCPU 704 renders the multimedia content at a default angle until rendering duration t=2 min. At t=2 min, the MCPU 704 begins gradually changing the viewing angle of the multimedia content. In "d=5 sec" duration, the MCPU 704 achieves an offset of a 10-degree horizontal (represented by ah) and a 20-degree vertical (represented by av). The MCPU 704 continues to render the multimedia at the 10-degree horizontal and the 20-degree vertical angles until rendering duration t=5 min. After an elapse of the rendering duration t=5 min, the MCPU 704 instantly shifts or rotates or changes the viewing angle to achieve an offset of a 25-degree horizontal and a 30-degree vertical since a 'duration d' value is absent in the angle-marked link. The MCPU 704 now continually renders the multimedia content at these angles until the end in absence of any further angle information in the angle-marked link.

In another example, the multiple angle information including a default-viewing angle is embedded for different rendering duration. As such, the angle-marked link can be www.myvideo.com/id=xyz?t=2m#ah=10#av=20?t=3m#default?t=5m#ah=25#av=30.

Accordingly, upon accessing the angle-marked link, the MCPU 704 renders the multimedia content at a default angle until rendering duration t=2 min. At t=2 min, the MCPU 704 instantly shifts the viewing angle to achieve an offset of a 10-degree horizontal and 20-degree vertical offset. The MCPU 704 continues to render the multimedia at the 10-degree horizontal and 20-degree vertical angles until rendering duration t=3 min. After elapse of the rendering duration t=3 min, the MCPU 704 resets the viewing angle to the default angle and renders the multimedia content at the default angle until rendering duration t=5 min. After elapse of the rendering duration t=5 min, the MCPU 704 instantly shifts the viewing angle to achieve an offset of a 25 degree horizontal and 30 degree vertical offset. The MCPU 704 now continually renders the multimedia content at these angles until the end in absence of any further angle information in the angle-marked link.

In another example, the multiple angle information including a default-viewing angle is embedded for different rendering durations and pause durations. As such, the angle-marked link can be www.myvideo.com/id=xyz?t=2m#pd=5s#ah=10#av=20?t=3m#default?t=5m#ah=25# av=30.

Accordingly, upon accessing the angle-marked link, the MCPU 704 renders the multimedia content at a default angle until rendering duration t=2 min. At t=2 min, the MCPU 704 pauses rendering of the multimedia content for 5 seconds (represented by 'pd') and begins gradually changing the viewing angle of the multimedia content. In "pd=5 sec" duration, the MCPU 704 achieves an offset of a 10-degree horizontal and 20-degree vertical offset. The MCPU 704 then continues to render the multimedia at the 10-degree horizontal and 20-degree vertical angles until rendering duration t=3 min. After elapse of the rendering duration t=3 min, the MCPU 704 resets the viewing angle to the default angle and renders the multimedia content at the default angle until rendering duration t=5 min. After elapse of the rendering duration t=5 min, the MCPU 704 instantly shifts the viewing angle to achieve an offset of a 25 degree horizontal and 30 degree vertical offset. The MCPU 704 now continually renders the multimedia content at these angles until the end in absence of any further angle information in the angle-marked link.

Similarly, the angle-marked content unit 708 appends at least one parameter in the list of attributes along with information pertaining to the one or more second viewing angles. Based on the at least one parameter and the information pertaining to the one or more second viewing angles, the MCPU 704 renders the multimedia content at different angles.

Further, the sharing unit 706 enables a storing of the angle-marked link and/or the angle-marked content in a storage such as a memory of the electronic device 700, a pen drive, and a compact disk. Examples of such a storing include, but are not limited to, bookmarking, a recent played video list, and a new playlist. Furthermore, the one or more recipients can further change the viewing angles of the multimedia content in a manner as described in reference to FIG. 3A.

As would be understood, the command can be received as a user-input. The user-input can be either a touch input, a touch based gesture input, a non-touch based gesture input, a manual input, or a combination thereof. The user-input can be provided using an input device such as a mouse, a keyboard, a joystick, and a stylus communicatively coupled with the electronic device 700. Thus, the input receiving unit 709 is a device capable of detecting the user-input and classifying as per the above-mentioned function.

Further, the electronic device 700 may include a memory 710. The memory 710 may be a main memory, a static memory, or a dynamic memory. The electronic device 700 may include a processor 711. The processor 711 may be one or more general processors, digital signal processors, application specific integrated circuits, field programmable gate arrays, servers, networks, digital circuits, analog circuits, combinations thereof, or other now known or later developed devices for analyzing and processing data. In one implementation, the rendering unit 701 and the sharing unit 706 are external to the processor 711. In another implementation, the rendering unit 701 and the sharing unit 706 are integral to the processor 711. The processor 711 may control the rendering unit 701 and the sharing unit 706. In another implementation, the rendering unit 701 and the sharing unit 706 can be one single unit. In another implementation, the rendering unit 701 and the sharing unit 706 can be different units. In another implementation, the rendering unit 701 and the sharing unit 706 are implemented as specific hardware elements. In another implementation, the rendering unit 701 and the sharing unit 706 are implemented as a combination of hardware and software elements. In yet another implementation, the rendering unit 701 and the sharing unit 706 are implemented as software elements such as a mobile application and plug-in to web browsers accessed via the electronic device 700.

The electronic device 700 may include other input/output units (not shown) for receiving and outputting data. The electronic device 700 may include a communication interface unit (not shown) to communicatively couple with any other device over a network. The network can be a wired network and a wireless network. The various units of the electronic device 700 can communicate via a bus (not shown).

For the ease of understanding, the forthcoming description of FIGS. 8A to 8D illustrate various implementations of the disclosure, as described in reference to FIGS. 4A to 4C above. However, it may be strictly understood that the forthcoming examples shall not be construed as being limitations towards the present disclosure and the present disclosure may be extended to cover analogous manifestations through other types of like mechanisms.

FIGS. 8A to 8D illustrate third examples of rendering the multimedia content according to various embodiments of the present disclosure. In the example, the reference complete frame corresponds to the reference complete frame 401 illustrated in FIG. 4A.

Figure 8A:
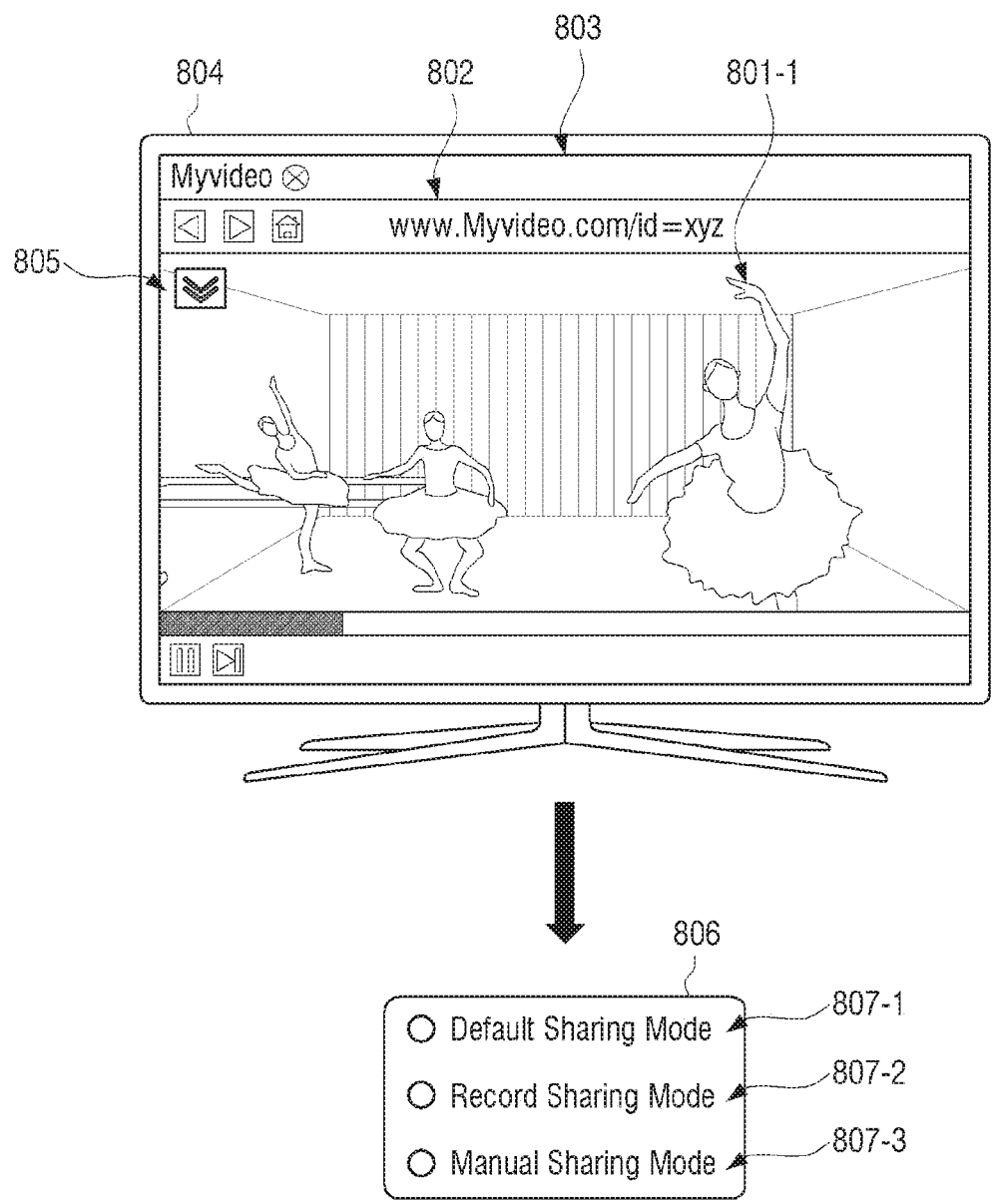
FIGS. 8A, 8B, 8C, and 8D illustrate third examples of rendering 360-degree multimedia content according to various embodiments of the present disclosure.

Referring to FIG. 8A, multimedia content at a first angle 801-1 is rendered via a web browser 802 on a display 803 of an electronic device 804. For the sake of brevity and understanding, the reference numeral 801 on the left side of the hyphenated reference character 801-1 represents the multimedia content and reference numeral 1 on right side of the hyphenated reference character 801-1 represents the first angle. The electronic device 804 includes the sharing unit 706 that provides a GUI control element 805 to share the multimedia content. In the example, the GUI control element 805 is represented as a button on the UI. In another example, the GUI control element 805 can be provided as a context menu upon a 'right-click' of a mouse. In another example, the GUI control element 805 is represented as an icon on the UI.

Upon accessing the GUI control element 805, the sharing unit 706 provides a UI 806 depicting the different sharing modes such as a default sharing mode 807-1, a record sharing mode 807-2, and a manual sharing mode 807-3.

Figure 8B:
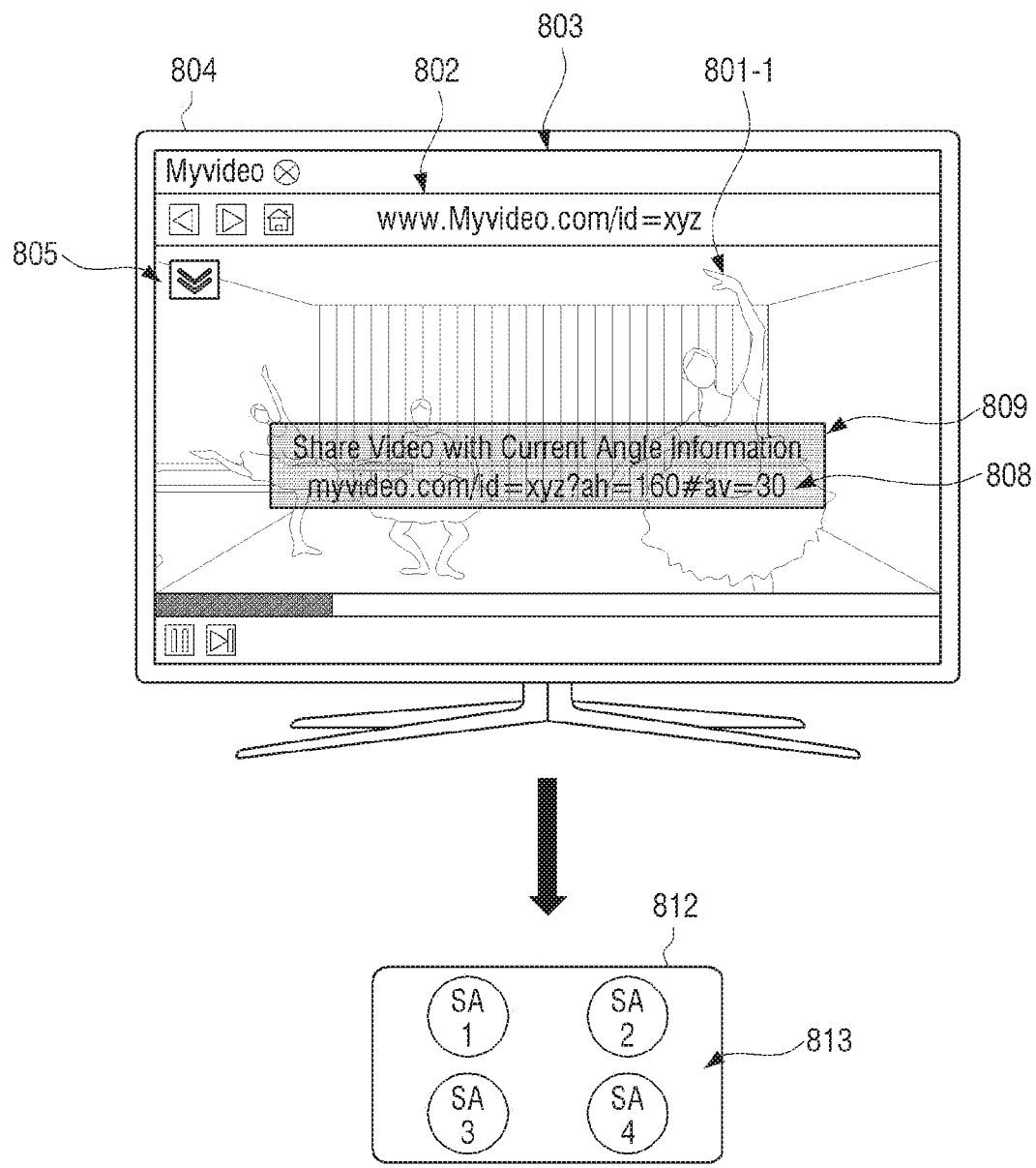

Referring to FIG. 8B, upon selecting the default sharing mode 807-1 illustrated in FIG. 8A, the sharing unit 706 obtains a base link of the multimedia content 801 from the web browser 802 and creates an angle-marked link 808 as a viewing mechanism by embedding the first viewing angle in the base link. The angle-marked link 808 indicates the current viewing angle, i.e., the first viewing angle. The sharing unit 706 then provides a notification 809 on the display 803 depicting the angle-marked link 808. The notification 809 enables the user to check the viewing angle before sharing. Examples of the notification 809 include, but are not limited to, a flash message, a floating message, and an overlay UI.

Likewise, upon selecting the record sharing mode 807-2 illustrated in FIG. 8A, the sharing unit 706 records a sequence of angles and related timing information based on a user action while the multimedia content 801 is being rendered on the display 803. In an example, the user watches the multimedia content 801 at a default-viewing angle until rendering duration t=2 min. At t=2 min, the user pauses the multimedia content 801 and then changes the viewing angle gradually in a "pd=5 sec" pause duration to achieve an offset of a 10 degree horizontal and 20 degree vertical offset. Thereafter, the user resumes the multimedia content 801 and accordingly, the rendering unit 701 renders the multimedia content 801 at the 10-degree horizontal and 20 degree vertical angles.

The user then watches the multimedia content 801 at the 10-degree horizontal and 20 degree vertical angles until rendering duration t=3 min. Then, the user resets the multimedia content 801, currently being rendered at the 10-degree horizontal and 20 degree vertical angles, to the default-viewing angle by selecting the default mode at t=3 min. Accordingly, the rendering unit 701 renders the multimedia content 801 at the default-viewing angle.

The user then watches the multimedia content 801 at the default angle until rendering duration t=5 min. At t=5 min, the user rotates the multimedia content 801, currently being rendered at the default-viewing angle, to achieve an instant offset of a 25 degree horizontal and 30 degree vertical angle offset. Accordingly, the rendering unit 701 renders the multimedia content 801 at the 25-degree horizontal and 30 degree vertical angles. The user then watches the multimedia content 801 at the 25 degree horizontal and 30 degree vertical angles until the end.

Simultaneously, the sharing unit 706 records the angle information and related timing information in accordance with the sequence of the user action and creates the angle-marked link as www.myvideo.com/id=xyz?t=2m#pd=5s#ah=10#av=20?t=3m#default?t=5m#ah=25#av=30.

The sharing unit 706 then provides the notification 809 on the display 803 depicting the angle-marked link 808.

Figure 8C:
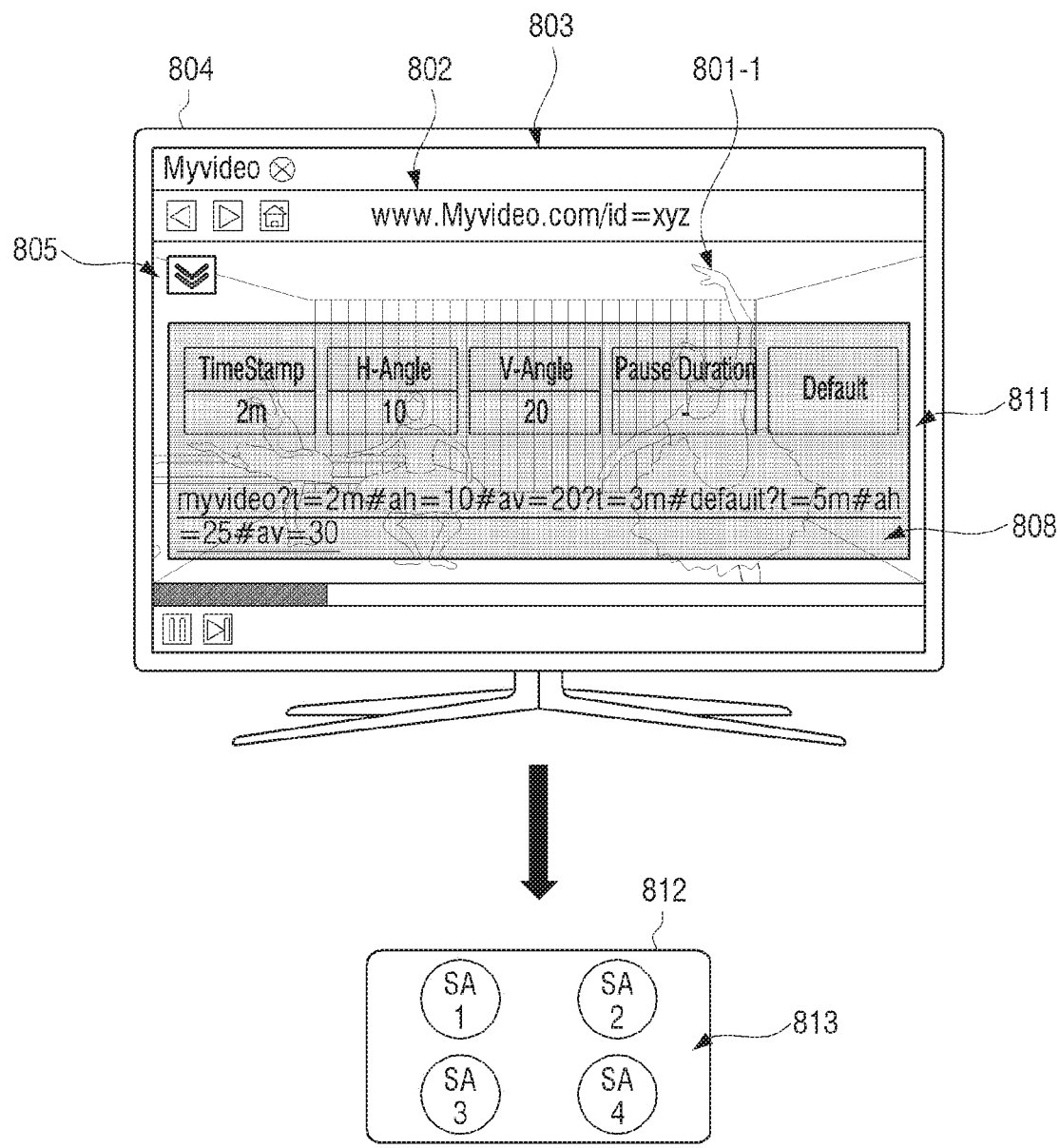

Referring to FIG. 8C, in a similar manner, upon selecting the manual sharing mode 807-3 illustrated in FIG. 8A, the sharing unit 706 may obtain the base link of the multimedia content 801 from the web browser 802 and create the angle-marked link 808 as a viewing mechanism by embedding the first viewing angle in the base link. The angle-marked link 808 indicates the current viewing angle, i.e., the first viewing angle. The sharing unit 706 then provides a UI 810 on the display 803 depicting the angle-marked link 808. The UI 810 may further include a plurality of text fields 811 corresponding to the viewing angles and the at least one parameter for receiving a manual user-input. For the sake of brevity, rendering duration, horizontal angle, vertical angle, pause duration, and default angle are illustrated as the plurality of text fields 811. The sharing unit 706 modifies and/or updates the angle-marked link 808 in accordance with data obtained from a manual user-input via the plurality of text fields 811 and displays the modified and/or updated angle-marked link 808 in the UI 810. For example, the data obtained from the manual user-input indicates after an elapse of rendering duration t=2 min, the angle is instantly changed to 10-degree horizontal and 20 degree vertical angles and the angle-marked link 808 is www.myvideo.com/id=xyz?t=2m#ah=10#av=20.

The UI 810 may further include a GUI control element (not shown) to select one or more sharing applications. Upon accessing the GUI control element to select one or more sharing applications, referring to FIGS. 8B and 8C, the sharing unit 706 may provide another UI 812 including a list of sharing applications 813 available on the electronic device 804. Examples of the sharing application include, but are not limited to, an email application, a chat application, a content sharing application, and a communication link. For the sake of brevity, only four sharing applications SA1, SA2, SA3, and S4 have been illustrated. Upon selecting one or more sharing applications in the other UI 812, the sharing unit 706 shares the link via the selected sharing application, in a manner known in the art.

Similarly, the sharing unit 706 may create and share the angle-marked content via the list of sharing applications 813.

Figure 8D:
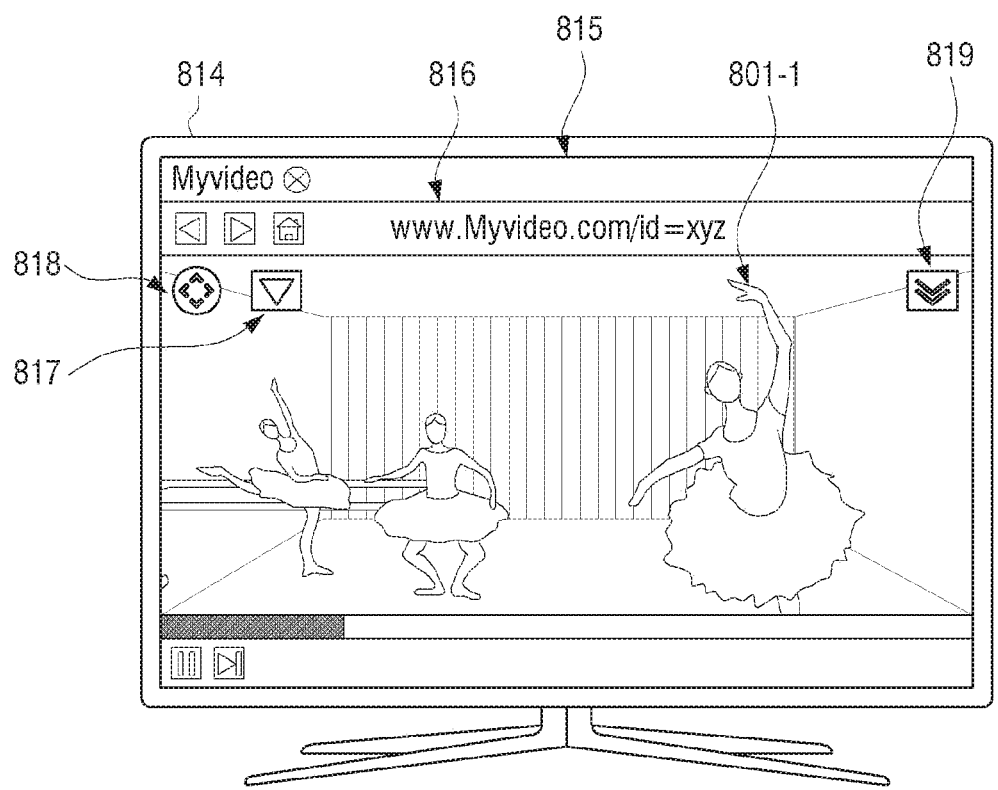

Referring to FIG. 8D, upon sharing the angle-marked link 808 or the angle-marked content via the list of sharing applications 813 illustrated in FIG. 8C with a recipient, the recipient can access the angle-marked link 808 or the angle-marked content on a second electronic device 814. The second electronic device 814 can also include the rendering unit 701 and the sharing unit 706. Upon accessing the angle-marked link 808 or the angle-marked content on the second electronic device 814, the rendering unit 701 renders the multimedia content at a second angle 801-2 on a display 815 via a web browser 816 in accordance with the angle-marked link 808 illustrated in FIG. 8C or the angle-marked content. Although FIG. 8D. illustrates the multimedia content being rendered at the second angle, it is to be understood that the multimedia content can be rendered at the first angle as well when the selected sharing mode is the default sharing mode.

The rendering unit 701 may provide GUI control elements 817, 818 to view the multimedia content at different angles, in a manner as described with reference to FIGS. 3A and 3B, 4A to 4C, and 5A to 5J. As such, the recipient user can further change the viewing angle of the multimedia content 801 on the second electronic device 814, in a manner as described with reference to FIGS. 3A and 3B, 4A to 4C, and 5A to 5J. The sharing unit 706 may also provide a GUI control element 819 to share the multimedia content at different angles, as described above. As such, the recipient user can further create and share a viewing mechanism with further recipients for viewing the multimedia content at different angles.

Figure 9:
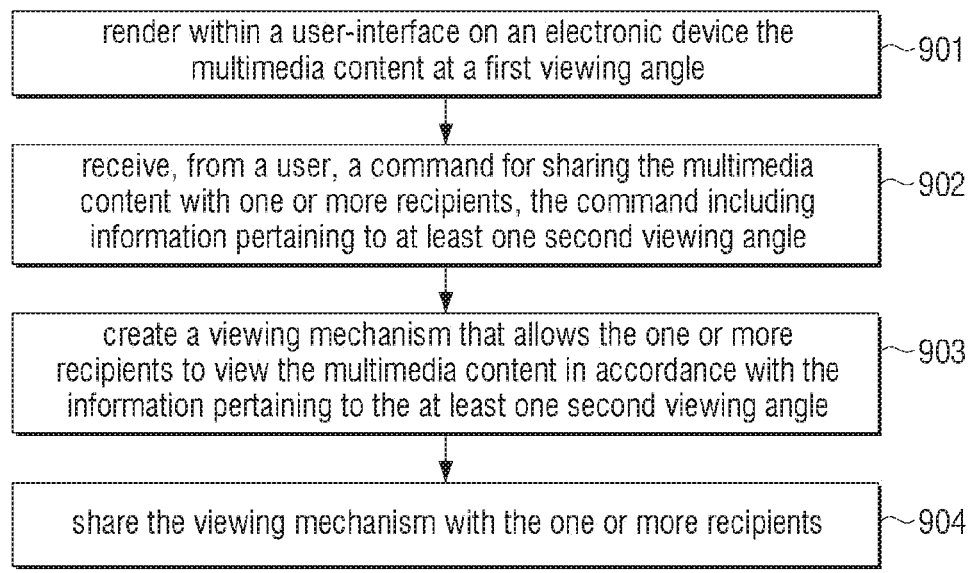
FIG. 9 illustrates a method for rendering 360-degree multimedia content according to an embodiment of the present disclosure.

FIG. 9 illustrates a method for rendering 360-degree multimedia content according to an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

Referring to FIG. 9, at operation 901, the multimedia content is rendered within a UI on an electronic device at a first viewing angle. For example, the rendering unit 701 displays the multimedia content at a first angle on the display.

At operation 902, a command for sharing the multimedia content with one or more recipients is received from a user. The command includes information pertaining to at least one second viewing angle. For example, the input receiving unit 709 receives the command to share the multimedia content.

At operation 903, a viewing mechanism is created that allows the one or more recipients to view the multimedia content in accordance with the information pertaining to at least one second viewing angle. For example, the sharing unit 706 creates the viewing mechanism in response to the command received by the input receiving unit 709.

At operation 904, the viewing mechanism is shared with the one or more recipients. For example, the sharing unit 706 shares the viewing mechanism via one or more sharing applications.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The instructions may include machine language codes created by a compiler, and high-level language codes that can be executed by a computer by using an interpreter. The above-described hardware device may be configured to operate as one or more software modules to perform the operations according to various embodiments of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device, comprising:
a display; and
a processor configured to:
 control the display to display multimedia content rendered at a first viewing angle, receive a first user input for changing a viewing angle of the multimedia content, in response to receiving the first user input, control the display to display a viewing angle option list comprising a plurality of predefined viewing angles, in response to receiving a second user input for selecting a second viewing angle included in the viewing angle option list, render the multimedia content at the second viewing angle, control the display to display the multimedia content rendered at the second viewing angle, control the display to display, on the multimedia content, a sharing user interface (UI) element for sharing the multimedia content of at least one viewing angle with another electronic apparatus, and in response to the sharing UI element being selected, control the display to display a list including a plurality of sharing modes, wherein the multimedia content includes at least one image frame captured with a 360-degree angle of view, wherein the multimedia content rendered at the first viewing angle includes a first portion of the at least one image frame captured with the 360-degree angle of the view, and wherein the multimedia content rendered at the second viewing angle includes a second portion, different from the first portion, of the at least one image frame captured with the 360-degree angle of the view.

2. The device according to claim 1,
wherein the viewing angle option list further comprises a user definable viewing angle option, and
wherein the at least one processor is further configured to, in response to receiving an input associated with the user defined viewing angle option being selected, control the display to display a window for editing a horizontal viewing angle or a vertical viewing angle of the multimedia content.

3. The device according to claim 1,
wherein, to control the display to display the multimedia content rendered at the first viewing angle and the second viewing angle, the processor is further configured to:
control the display to display the multimedia content rendered at the second viewing angle in a preview screen on one area of the display, and wherein the processor is further configured to:
render the preview screen such that the preview screen includes the multimedia content rendered at the second viewing angle and at least one of a first user interface (UI) element or a second UI element, the first UI element comprising a user definable viewing angle option and the second UI element comprising at least one predefined viewing angle option,
in response to receiving a third user input for selecting an option associated with the first UI element or the second UI element, render the multimedia content at a third viewing angle, and
control the display to display the multimedia content rendered at the third viewing angle in the preview screen.

4. The device according to claim 3,
wherein the processor is further configured to render the multimedia content at the first viewing angle and the second viewing angle simultaneously rendered, wherein at least one of the multimedia content rendered at the first viewing angle or the multimedia content rendered at the second viewing angle is rendered in a web browser, and wherein the web browser and the preview screen include separate controls for changing a viewing angle of the multimedia content.

5. The device according to claim 1,
wherein the plurality of sharing modes comprise a first sharing mode for providing a default viewing angle, a second sharing mode for providing a viewing angle preferred by a user based on information of a viewing angle according to reproduction history of multimedia content rendered on the display, and a third sharing mode for providing a viewing angle of multimedia content which is set by the user.

6. The device according to claim 5, wherein the processor is further configured to, in response to the first sharing mode being selected, control the display to display current viewing angle information as a notification message.

7. The device according to claim 5, wherein the processor is further configured to store a sequence of a viewing angle and related timing information in a memory based on a user operation while the multimedia content is being rendered in the first area to generate the second sharing mode information.

8. The device according to claim 5, wherein the processor is further configured to:
in response to the third sharing mode being selected, control the display to display a vertical angle indicator or a horizontal angle indicator associated with a current viewing angle and an editing window including a timestamp,
store angle and time information, which is edited in the editing window by the user, and
transmit the stored information to a different electronic apparatus.

9. The device according to claim 1,
wherein the processor is further configured to transmit information associated with a change in viewing angle the other electronic apparatus, and
wherein the other electronic apparatus displays the multimedia content on a display of the other electronic apparatus based on the information associated with the change in viewing angle.

10. The device according to claim 1,
wherein the viewing angle option list further comprises an option associated with monitoring requests for a change in viewing angle over time, and
wherein the at least one processor is further configured to:
in response to receiving an input for selecting of the option associated with monitoring requests for the change in viewing angle over time:
generate information associated with each request for a change of viewing angle of the multimedia content while the multimedia content is displayed on the display, and
store the information associated with each request for the change of viewing angle of the multimedia content, and
render the multimedia content according to the stored information associated with request for the change of viewing angle of the multimedia content.

11. The device according to claim 10,
wherein the information associated with each request for the change of viewing angle of the multimedia content while the multimedia content is displayed is stored as metadata of the multimedia content.

12. A controlling method of an electronic apparatus, the controlling method comprising:
displaying multimedia content rendered at a first viewing;
receiving a first user input for changing a viewing angle of the multimedia content;
in response to receiving the first user input, displaying a viewing angle option list comprising a plurality of predefined viewing angles;
in response to receiving a second user input for selecting a second viewing angle included in the viewing angle option list, rendering the multimedia content at a second viewing angle;
displaying the multimedia content rendered at the second viewing angle; and
displaying a sharing user interface (UI) element for sharing the multimedia content of at least one viewing angle with another electronic apparatus,
wherein the displaying of the sharing UI element comprises displaying, in response to the sharing UI element being selected, a list including a plurality of sharing modes,
wherein the multimedia content includes at least one image frame captured with a 360-degree angle of view,
wherein the multimedia content rendered at the first viewing angle includes a first portion of the at least one image frame captured with the 360-degree angle of the view, and
wherein the multimedia content rendered at the second viewing angle includes a second portion, different from the first portion, of the at least one image frame captured with the 360-degree angle of the view.

13. The method of claim 12,
wherein the viewing angle option list further comprises a user definable viewing angle option, and
wherein the displaying of the viewing angle option list comprises:
in response to receiving an input associated with the user defined viewing angle option being selected, displaying a window for editing a horizontal viewing angle or a vertical viewing angle of the multimedia content.

14. The method of claim 12, further comprising:
displaying the multimedia content rendered at the second viewing angle in a preview screen on one area of the display;
rendering the preview screen such that the preview screen includes the multimedia content rendered at the second viewing angle and at least one of a first user interface (UI) element or a second UI element, the first UI element comprising a user definable viewing angle option and the second UI element comprising at least one predetermined viewing angle option;
in response to receiving a third user input for selecting an option associated with the first UI element or the second UI element, rendering the multimedia content at a third viewing angle; and
displaying the multimedia content rendered at the third viewing angle in the preview screen.

15. The method of claim 12,
wherein the plurality of sharing modes comprises:
a first sharing mode for providing a default viewing angle, a second sharing mode for providing a viewing angle preferred by a user based on information of a viewing angle according to reproduction history of multimedia content rendered on the display, and a third sharing mode for providing a viewing angle of multimedia content which is set by the user.

16. The method of claim 15, further comprising:
in response to the first sharing mode being selected, displaying current viewing angle information as a notification message.

17. The method of claim 15, further comprising:
in response to the second sharing mode being selected, storing information associated with a sequence of viewing angles and timing information related to each viewing angle in a memory.

18. The method of claim 15, further comprising:
in response to the third sharing mode being selected, displaying a vertical angle indicator or a horizontal angle indicator associated with a current viewing angle and an editing window including timestamp;
storing angle and time information, which is edited in the editing window by the user; and
transmitting the stored information to a different electronic apparatus.

19. The method of claim 12, further comprising:
transmitting information associated with a change in viewing angle information to the other electronic apparatus,
wherein the other electronic apparatus displays the multimedia content on a display of the other electronic apparatus based on the information associated with the change in viewing angle.

20. The method according to claim 12,
wherein the viewing angle option list further comprises an option associated with monitoring requests for a change in viewing angle over time, and
wherein the method further comprises:
in response to receiving an input for selecting of the option associated with monitoring requests for the change in viewing angle over time:
generating information associated with each request for a change of viewing angle of the multimedia content while the multimedia content is displayed on the display, and
storing the information associated with each request for the change of viewing angle of the multimedia content, and
rendering the multimedia content according to the stored information associated with request for the change of viewing angle of the multimedia content.

21. The method according to claim 20,
wherein the information associated with each request for the change of viewing angle of the multimedia content while the multimedia content is displayed is stored as metadata of the multimedia content.

22. A non-transitory computer readable recording medium having recorded thereon a program executable by at least one processor for performing a method of controlling an electronic device, the controlling method comprising:
displaying on a display multimedia content rendered at a first viewing angle, the multimedia content including at least one image frame captured with a 360-degree angle of view;
displaying, on the multimedia content rendered at the first viewing angle, a first user interface (UI) element configured to provide an option to change the first viewing angle to a predetermined viewing angle and display the multimedia content at the predetermined viewing angle;

in response to receiving a first input associated with a selection of the first UI element, displaying a viewing angle option list to select one of a plurality predefined viewing angles;

in response to receiving a second input associated with a selection of a second viewing angle included in the viewing angle option list, rendering the multimedia content at the second viewing angle;

displaying the multimedia content rendered at the second viewing angle; and displaying a sharing user interface (UI) element for sharing the multimedia content of at least one viewing angle with another electronic apparatus, wherein the displaying of the sharing UI element comprises displaying, in response to the sharing UI element being selected, a list including a plurality of sharing modes, wherein the multimedia content rendered at the first viewing angle includes a first portion of the at least one image frame captured with the 360-degree angle of the view, and wherein the multimedia content rendered at the second viewing angle includes a second portion, different from the first portion, of the at least one image frame captured with the 360-degree angle of the view.

* * * * *